United States Patent
Dabbadi et al.

(10) Patent No.: US 12,262,063 B2
(45) Date of Patent: Mar. 25, 2025

(54) SYSTEMS AND METHODS OF VIDEO DECODING WITH DYNAMIC NOISE RECONSTRUCTION

(71) Applicant: QUALCOMM Incorporated, San Diego, CA (US)

(72) Inventors: Gopi Madhan Dabbadi, Bangalore (IN); Rosali Patro, Berhampur (IN); Shengqi Yang, Carlsbad, CA (US); Sandeep Nellikatte Srivatsa, Bangalore (IN); Ashish Mishra, Bhubaneswar (IN)

(73) Assignee: QUALCOMM INCORPORATED, San Diego, CA (US)

( * ) Notice: Subject to any disclaimer, the term of this patent is extended or adjusted under 35 U.S.C. 154(b) by 100 days.

(21) Appl. No.: 17/934,141

(22) Filed: Sep. 21, 2022

(65) Prior Publication Data

US 2024/0098309 A1    Mar. 21, 2024

(51) Int. Cl.
| | |
|---|---|
| H04N 11/02 | (2006.01) |
| H04N 19/154 | (2014.01) |
| H04N 19/176 | (2014.01) |
| H04N 19/182 | (2014.01) |
| H04N 19/85 | (2014.01) |

(52) U.S. Cl.
CPC ......... *H04N 19/85* (2014.11); *H04N 19/154* (2014.11); *H04N 19/176* (2014.11); *H04N 19/182* (2014.11)

(58) Field of Classification Search
CPC .................................................. H04N 19/85
USPC ...................... 375/240.01–240.29
See application file for complete search history.

(56) References Cited

U.S. PATENT DOCUMENTS

| 8,023,567 B2 | 9/2011 | Gomila et al. | |
|---|---|---|---|
| 10,832,381 B2* | 11/2020 | Strobel | G06T 5/70 |
| 11,765,372 B1* | 9/2023 | Waggoner | H04N 19/172 |
| | | | 375/240.03 |
| 2006/0133686 A1* | 6/2006 | Gomila | H04N 19/176 |
| | | | 382/254 |
| 2006/0164428 A1* | 7/2006 | Cook | G06T 15/50 |
| | | | 345/581 |
| 2006/0182183 A1* | 8/2006 | Winger | H04N 19/44 |
| | | | 375/240.27 |
| 2007/0058878 A1* | 3/2007 | Gomilla | G06T 5/10 |
| | | | 375/E7.176 |
| 2007/0070241 A1* | 3/2007 | Boyce | H04N 5/262 |
| | | | 382/128 |
| 2007/0140588 A1* | 6/2007 | Balram | G06T 5/70 |
| | | | 382/268 |

(Continued)

OTHER PUBLICATIONS

International Search Report and Written Opinion—PCT/US2023/070961—ISA/EPO—Oct. 10, 2023.

(Continued)

*Primary Examiner* — Leron Beck
(74) *Attorney, Agent, or Firm* — Polsinelli LLP

(57) ABSTRACT

Systems and methods for decoding are described. A decoder system is configured to retrieve, from the grain array stored within the on-chip memory, noise pixel data associated with at least one reconstructed video pixel. The decoder system is configured to apply noise data to the at least one reconstructed video pixel to generate at least one output video pixel. The noise data is determined based on the noise pixel data.

30 Claims, 11 Drawing Sheets

(56) References Cited

U.S. PATENT DOCUMENTS

| | | | | |
|---|---|---|---|---|
| 2008/0055462 A1* | 3/2008 | Garg | ................ | H04N 5/45 |
| | | | | 348/387.1 |
| 2012/0057808 A1* | 3/2012 | Minegishi | ............ | H04N 1/40 |
| | | | | 382/298 |
| 2019/0132594 A1* | 5/2019 | Chung | ............ | H04N 19/147 |
| 2019/0208217 A1* | 7/2019 | Zhou | ............ | H04N 19/176 |
| 2022/0038748 A1* | 2/2022 | Guionnet | ............ | H04N 19/80 |
| 2023/0050950 A1* | 2/2023 | Kadu | ............ | G06T 9/007 |

OTHER PUBLICATIONS

Norkin A (Netflix)., "Alternative Film Grain Characteristics SEI Message", Joint Collaborative Team on Video Coding (JCT-VC) of ITU-T SG 16 WP 3 and ISO/IEC JTC1/SC29/WG11, JCTVC-AM0026-v1, 39th Meeting, by teleconference, Apr. 18, 2020-Apr. 24, 2020, No. m53906, Apr. 18, 2020, XP030287765, 13 pages, section 5.1, p. 11.

* cited by examiner

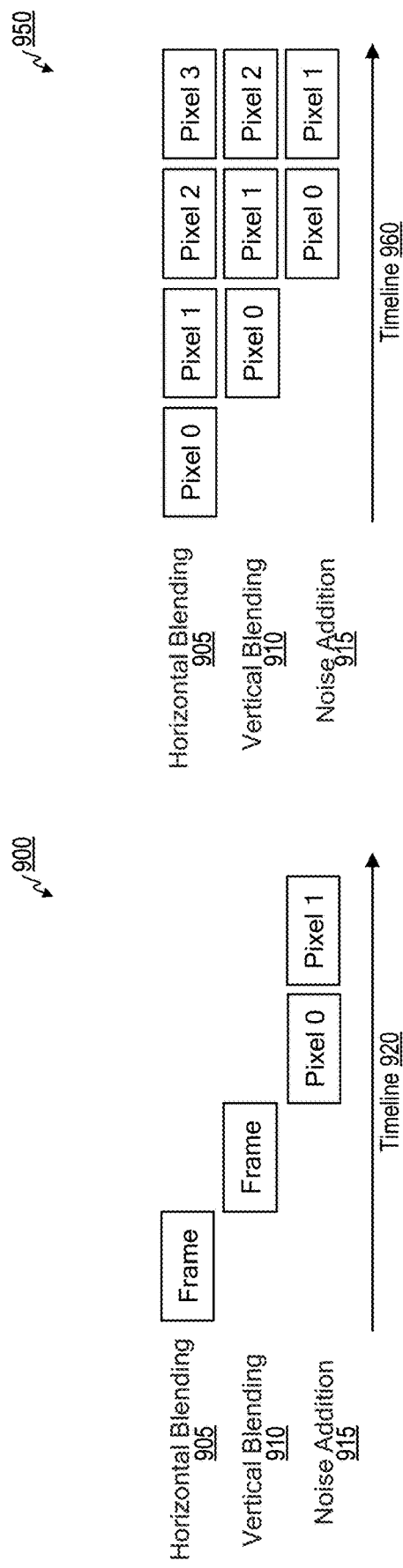

/ 1000

```
┌─────────────────────────────────────────────────────────────────────────┐
│ Retrieve, From The Grain Array Stored Within The On-Chip Memory, Noise │
│ Pixel Data Associated With At Least One Reconstructed Video Pixel       │
│                              1005                                       │
└─────────────────────────────────────────────────────────────────────────┘
                                    │
                                    ▼
┌─────────────────────────────────────────────────────────────────────────┐
│ Apply Noise Data To The At Least One Reconstructed Video Pixel To       │
│ Generate At Least One Output Video Pixel, Wherein The Noise Data Is     │
│ Determined Based On The Noise Pixel Data                                │
│                              1010                                       │
└─────────────────────────────────────────────────────────────────────────┘
```

FIG. 10

SYSTEMS AND METHODS OF VIDEO DECODING WITH DYNAMIC NOISE RECONSTRUCTION

FIELD

This application is related to video decoding and decompression. More specifically, this application relates to systems and methods of performing video decoding in which film grain or another type of noise is reconstructed and added into the decoded video dynamically.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, cellular or satellite radio telephones, mobile phones (e.g., so-called "smart phones"), video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. The large amount of video data needed to meet these demands places a burden on communication networks and devices that process and store the video data.

Digital video devices can implement video coding techniques to compress video data. Video coding can be performed according to one or more video codecs and/or coding formats. For example, video codecs and/or coding formats include versatile video coding (VVC), Essential Video Coding (EVC), high-efficiency video coding (HEVC), VP8, VP9, advanced video coding (AVC), MPEG-2 Part 2 coding (MPEG stands for moving picture experts group), among others, as well as proprietary video codecs/formats such as AOMedia Video 1 (AV1) that was developed by the Alliance for Open Media and SMPTE 421 (also known as VC-1), among others. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. A goal of video decoding techniques is to recreate the original video data as closely as possible from the compressed video data. With ever-evolving video services becoming available, coding and decoding techniques with improved coding and decoding efficiencies are needed.

In some cases, a video may include film grain or other types of noise. Film grain can provide a desirable aesthetic effect in a video, and it can be desirable for film grain to be retained through an encoding and decoding processes. However, in some video codecs/formats, film grain can be lost or degraded in the encoding and decoding processes. Further, in some video codecs/formats, the randomness of film grain or other types of noise can make it difficult to compress a video with film grain as much as a similar video without film grain.

BRIEF SUMMARY

Systems and techniques are described for video decoding, for instance involving film grain or another type of noise that is reconstructed by a decoder and added into a decoded video dynamically. In some examples, a decoder generates a grain array corresponding to an encoded video frame that is divided into blocks. The decoder generates random offsets for the blocks of the encoded video frame. The decoder retrieves noise pixel data from the grain array according to the random offsets based on positions of the noise pixel data in a noise image as compared to positions of the blocks in the encoded video frame. The decoder blends a portion of the noise pixel data in the noise image to generate a blended portion of the noise pixel data. The portion of the noise pixel data is located at positions in the noise image that correspond to boundaries between blocks of the plurality of blocks of the encoded video frame. The decoder adds at least the blended portion of the noise pixel data to reconstructed video frame data to generate output video frame data, the reconstructed video frame data generated based on the encoded video frame.

In one example, an apparatus for video decoding is provided. The apparatus includes at least one memory and at least one processor (e.g., implemented in circuitry) coupled to the memory. The at least one processor includes an on-chip memory storing a grain array. The at least one processor is configured to and can: retrieve, from the grain array stored within the on-chip memory, noise pixel data associated with at least one reconstructed video pixel; and apply noise data to the at least one reconstructed video pixel to generate at least one output video pixel, wherein the noise data is determined based on the noise pixel data.

In another example, a method of video decoding is provided. The method includes: retrieving, from a grain array stored within an on-chip memory that is part of a processor, noise pixel data associated with at least one reconstructed video pixel; and applying noise data to the at least one reconstructed video pixel to generate at least one output video pixel, wherein the noise data is determined based on the noise pixel data.

In another example, a non-transitory computer-readable medium is provided that has stored thereon instructions that, when executed by at least one processor having an on-chip memory, cause the at least one processor to: retrieve, from a grain array stored within the on-chip memory, noise pixel data associated with at least one reconstructed video pixel; and apply noise data to the at least one reconstructed video pixel to generate at least one output video pixel, wherein the noise data is determined based on the noise pixel data.

In another example, an apparatus for video decoding is provided. The apparatus includes: means for retrieving, from a grain array stored within an on-chip memory that is part of a processor, noise pixel data associated with at least one reconstructed video pixel; and means for applying noise data to the at least one reconstructed video pixel to generate at least one output video pixel, wherein the noise data is determined based on the noise pixel data.

In some aspects, one or more of the methods, apparatuses, and computer-readable medium described above further comprise: retrieving secondary noise pixel data from the grain array stored within the on-chip memory, the secondary noise pixel data associated with the at least one reconstructed video pixel, wherein the noise data is determined based on the noise pixel data and the secondary noise pixel data. In some aspects, one or more of the methods, apparatuses, and computer-readable medium described above further comprise: blending the noise pixel data and the secondary noise pixel data to determine the noise data, wherein at least one position of the at least one reconstructed video pixel in a video frame corresponds to an overlapping region in which a plurality of blocks of the video frame are arranged to overlap.

In some aspects, one or more of the methods, apparatuses, and computer-readable medium described above further comprise: generating the grain array using a grain parameter, the grain parameter determined based on video data, wherein the at least one reconstructed video pixel is configured to reconstruct a pixel of the video data. In some aspects, one or more of the methods, apparatuses, and computer-readable medium described above further comprise: storing the grain array in the on-chip memory.

In some aspects, one or more of the methods, apparatuses, and computer-readable medium described above further comprise: identifying a position of the noise pixel data in the grain array based on an offset to retrieve the noise pixel data, wherein the offset corresponds to a block that the at least one reconstructed video pixel is part of. In some aspects, the offset is determined based on a randomly generated value. In some aspects, the offset is determined based on a frame size of a video frame, wherein the at least one reconstructed video pixel is configured to reconstruct at least one pixel of the video frame. In some aspects, the block is based on the frame size.

In some aspects, one or more of the methods, apparatuses, and computer-readable medium described above further comprise: applying the noise data to the at least one reconstructed video pixel while determining secondary noise data based on secondary noise pixel data, the secondary noise pixel data retrieved from the grain array stored within the on-chip memory, the secondary noise pixel data associated with at least a second reconstructed video pixel. In some aspects, one or more of the methods, apparatuses, and computer-readable medium described above further comprise: applying the noise data to the at least one reconstructed video pixel while retrieving, from the grain array stored within the on-chip memory, secondary noise pixel data associated with at least a second reconstructed video pixel. In some aspects, one or more of the methods, apparatuses, and computer-readable medium described above further comprise: determining the noise pixel data while retrieving, from the grain array stored within the on-chip memory, secondary noise pixel data associated with at least a second reconstructed video pixel.

In some aspects, the noise pixel data is configured to be retrieved from the grain array stored within the on-chip memory on a pixel-by-pixel basis. In some aspects, the noise data is configured to be determined based on the noise pixel data on a pixel-by-pixel basis. In some aspects, the noise data is configured to be applied to the at least one reconstructed video pixel on a pixel-by-pixel basis.

In some aspects, the grain array is a luminosity grain array, and wherein the noise pixel data includes luminosity noise pixel data. In some aspects, the grain array is a chroma grain array, and wherein the noise pixel data includes chroma noise pixel data.

In some aspects, one or more of the methods, apparatuses, and computer-readable medium described above further comprise: applying a scaling factor to the at least one output video pixel. In some aspects, one or more of the methods, apparatuses, and computer-readable medium described above further comprise: rounding a pixel value of the at least one output video pixel. In some aspects, one or more of the methods, apparatuses, and computer-readable medium described above further comprise: clipping a pixel value of the at least one output video pixel.

In some aspects, at least one memory is configured to store the at least one reconstructed video pixel. In some aspects, one or more of the methods, apparatuses, and computer-readable medium described above further comprise: outputting the at least one output video pixel for storage in at least one memory. In some aspects, one or more of the methods, apparatuses, and computer-readable medium described above further comprise: a display that is configured to display the at least one output video pixel. In some aspects, one or more of the methods, apparatuses, and computer-readable medium described above further comprise: a communication interface that is configured to transmit the at least one output video pixel to a recipient device.

In some aspects, one or more of the methods, apparatuses, and computer-readable medium described above further comprise: encoding video data to generate encoded video data; and decoding at least the encoded video data to generate the at least one reconstructed video pixel.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures:

FIG. 9A is a conceptual diagram illustrating a timeline for horizontal blending, vertical blending, and noise addition using a decoder system that generates noise data for an entirety of a video frame before adding the noise data to the video frame, in accordance with some examples;

FIG. 9B is a conceptual diagram illustrating a timeline for horizontal blending, vertical blending, and noise addition using a decoder system that generates noise data on a pixel-by-pixel basis and adds the noise data to the video frame on a pixel-by-pixel basis, in accordance with some examples;

FIG. 10 is a flow diagram illustrating a codec process, in accordance with some examples.

DETAILED DESCRIPTION

Figure 1:
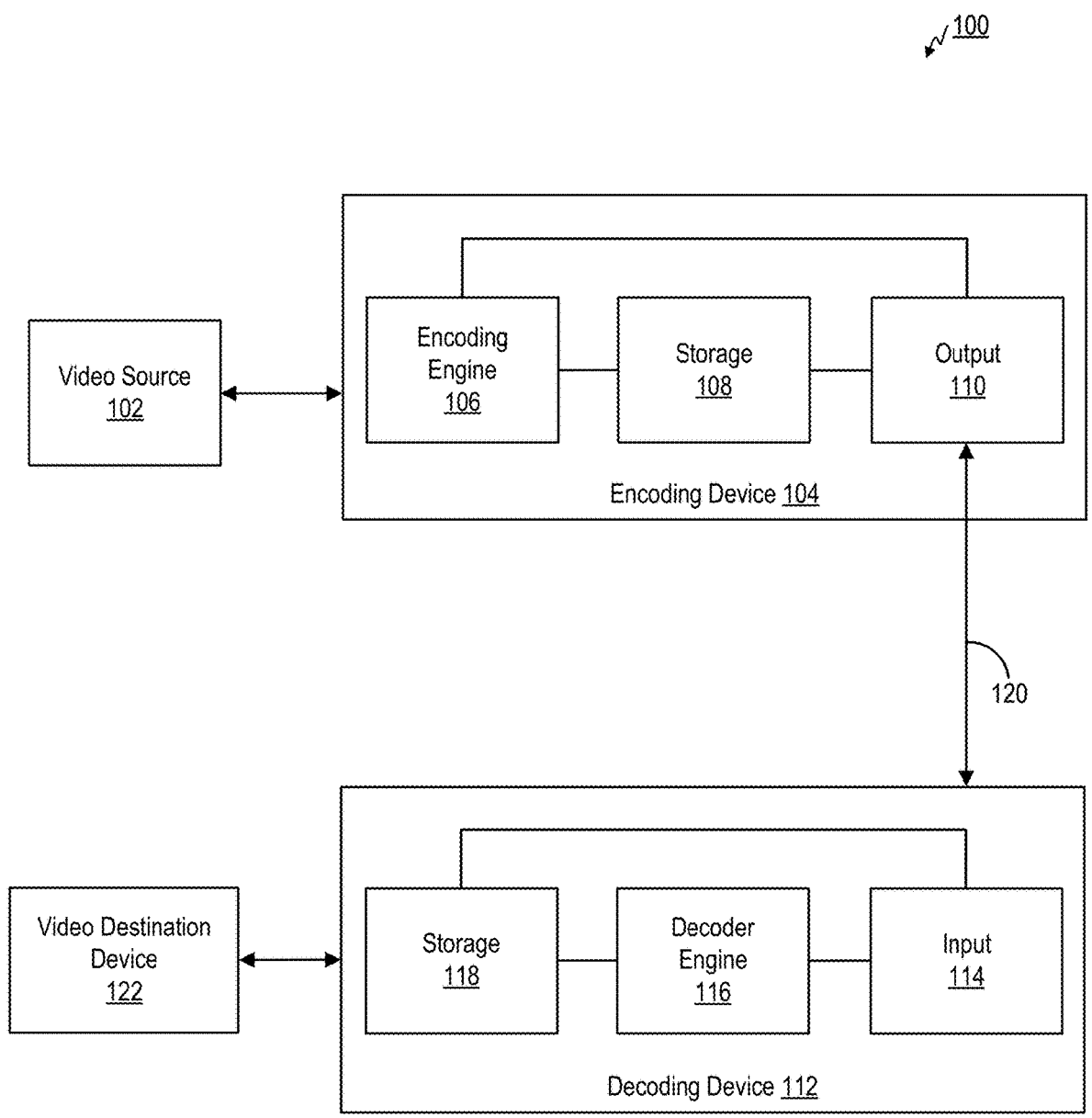
FIG. 1 is a block diagram illustrating an example of a system including an encoding device and a decoding device, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill. Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

In some cases, a video may include film grain or other types of noise. Film grain can provide a desirable aesthetic effect in a video, and it can be desirable for film grain to be retained through an encoding and decoding processes. However, in some video codecs/formats, film grain can be lost or degraded in the encoding and decoding processes. Further, in some video codecs/formats, the randomness of film grain or other types of noise can make it difficult to compress a video with film grain as much as a similar video without film grain.

Systems and techniques are described for video decoding, for instance involving film grain or another type of noise that is reconstructed by a decoder and added into a decoded video dynamically. In some examples, a decoder generates a grain array corresponding to an encoded video frame that is divided into blocks. The decoder generates random offsets for the blocks of the encoded video frame. The decoder retrieves noise pixel data from the grain array according to the random offsets based on positions of the noise pixel data in a noise image as compared to positions of the blocks in the encoded video frame. The decoder blends a portion of the noise pixel data in the noise image to generate a blended portion of the noise pixel data. The portion of the noise pixel data is located at positions in the noise image that correspond to boundaries between blocks of the plurality of blocks of the encoded video frame. The decoder adds at least the blended portion of the noise pixel data to reconstructed video frame data to generate output video frame data, the reconstructed video frame data generated based on the encoded video frame.

The codec systems and techniques described herein provide a number of technical improvements over prior codec systems. For instance, the codec systems and techniques described herein allow for reconstruction of film grain or other types of noise in decoded video, providing an improvement over codec systems in which film grain can be lost or degraded in the encoding and/or decoding processes. The codec systems and techniques described herein allow for the video to be compressed more than other codec systems. For instance, by filtering the noise out before encoding a video, generating grain parameters based on the noise that is filtered out, reconstructing the noise based on the grain parameters, and adding the reconstructed noise back into the decoded video, the encoded video can be compressed more heavily by the codec systems and techniques described herein, and still reconstruct film grain, than by codec systems that attempt to preserve film grain during encoding. This increased compression can correspond to reduced bit rate (in an illustrative example, by approximately 50%) over codec systems that attempt to preserve film grain during encoding. The codec systems and techniques described herein improve efficiency of reconstruction and addition of film grain by allowing for reconstruction and addition of film grain to occur dynamically (e.g., on a pixel-by-pixel basis), improving efficiency over codecs that wait for the entire frame of film grain data to be reconstructed before adding the film grain data to the decoded video. In some examples, dynamic film grain reconstruction of the codec systems and techniques described herein can provide a bandwidth savings of 778 megabytes per second (MBps) (given a 1080p resolution and a 120 frame per second (fps) frame rate) to 12,458 MBps (given an 8K resolution and a 120 fps frame rate). In some examples, dynamic film grain reconstruction of the codec systems and techniques described herein can reduce memory read and write cycles used during decoding, and therefore improves the speed of decoding streams, especially for higher bit-rate streams. In some examples, the speed and efficiency improvements for the codec systems and techniques described herein provide improved usability for low-latency use-cases, such as extended reality (XR) (e.g., virtual reality (VR), augmented reality (AR), and/or mixed reality (MR)).

Various aspects of the application will be described with respect to the figures. FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Examples of video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, and High Efficiency Video Coding (HEVC) or ITU-T H.265. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

MPEG and ITU-T VCEG have also formed a joint exploration video team (JVET) to explore new coding tools for the next generation of video coding standard, named Versatile Video Coding (VVC). The reference software is called VVC Test Model (VTM) (or JEM (joint exploration model)). An objective of VVC is to provide a significant improvement in compression performance over the existing HEVC standard, aiding in deployment of higher-quality video services and emerging applications (e.g., such as 360° omnidirectional immersive multimedia, high-dynamic-range (HDR) video, among others). VP9, Alliance of Open Media (AOMedia) Video 1 (AV1), and Essential Video Coding (EVC) are other video codecs and/or coding formats for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, such as MPEG, JPEG (or other coding standard for still images), VP9, AV1, extensions thereof, or other suitable codecs and/or coding formats already available or not yet available or developed. Accordingly, while the techniques and systems described herein may be described with reference to a particular video coding standard, one of ordinary skill in the art will appreciate that the description should not be interpreted to apply only to that particular standard.

Many embodiments described herein provide examples using the JEM model, VVC, the HEVC standard, and/or extensions thereof. However, the techniques and systems described herein may also be applicable to other coding standards, such as AVC, MPEG, JPEG (or other coding standard for still images), extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted $S_L$, $S_{Cb}$, and $S_{Cr}$. $S_L$ is a two-dimensional array of luma samples, $S_{Cb}$ is a two-dimensional array of Cb chrominance samples, and $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

Two classes of Network Abstraction Layer (NAL) units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning per HEVC, QTBT partitioning, MTT partitioning, or other partitioning structures. For illustrative purposes, the description herein may refer to QTBT partitioning. However, it should be understood that the techniques of this disclosure may also be applied to video coders configured to use quadtree partitioning, or other types of partitioning as well.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra-prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
| --- | --- |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, 1/2-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction, two sets of motion parameters ($\Delta x_0$, $y_0$, refIdx$_0$ and $\Delta x_1$, $y_1$, refIdx$_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction, one set of motion parameters ($\Delta x_0$, $y_0$, refIdx$_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As described above, for each block, a set of motion information (also referred to herein as motion parameters) can be available. A set of motion information contains motion information for forward and backward prediction directions. The forward and backward prediction directions are two prediction directions of a bi-directional prediction mode, in which case the terms "forward" and "backward" do not necessarily have a geometrical meaning. Instead, "forward" and "backward" correspond to reference picture list 0 (RefPicList0 or L0) and reference picture list 1 (RefPicList1 or L1) of a current picture. In some examples, when only one reference picture list is available for a picture or slice, only RefPicList0 is available and the motion information of each block of a slice is always forward.

In some cases, a motion vector together with its reference index is used in coding processes (e.g., motion compensation). Such a motion vector with the associated reference index is denoted as a uni-predictive set of motion information. For each prediction direction, the motion information can contain a reference index and a motion vector. In some cases, for simplicity, a motion vector itself may be referred in a way that it is assumed that it has an associated reference index. A reference index is used to identify a reference picture in the current reference picture list (RefPicList0 or RefPicList1). A motion vector has a horizontal and a vertical component that provide an offset from the coordinate position in the current picture to the coordinates in the reference picture identified by the reference index. For example, a reference index can indicate a particular reference picture that should be used for a block in a current picture, and the motion vector can indicate where in the reference picture the best-matched block (the block that best matches the current block) is in the reference picture.

A picture order count (POC) can be used in video coding standards to identify a display order of a picture. Although there are cases for which two pictures within one coded video sequence may have the same POC value, it typically does not happen within a coded video sequence. When multiple coded video sequences are present in a bitstream, pictures with a same value of POC may be closer to each other in terms of decoding order. POC values of pictures can be used for reference picture list construction, derivation of reference picture set as in HEVC, and motion vector scaling.

In H.264/AVC, each inter macroblock (MB) may be partitioned in four different ways, including: one 16×16 MB partition; two 16×8 MB partitions; two 8×16 MB partitions; and four 8×8 MB partitions. Different MB partitions in one MB may have different reference index values for each direction (RefPicList0 or RefPicList1). In some cases, when an MB is not partitioned into four 8×8 MB partitions, it can have only one motion vector for each MB partition in each direction. In some cases, when an MB is partitioned into four 8×8 MB partitions, each 8×8 MB partition can be further partitioned into sub-blocks, in which case each sub-block can have a different motion vector in each direction. In some examples, there are four different ways to get sub-blocks from an 8×8 MB partition, including: one 8×8 sub-block; two 8×4 sub-blocks; two 4×8 sub-blocks; and four 4×4 sub-blocks. Each sub-block can have a different motion vector in each direction. Therefore, a motion vector is present in a level equal to higher than sub-block.

In AVC, a temporal direct mode can be enabled at either the MB level or the MB partition level for skip and/or direct mode in B slices. For each MB partition, the motion vectors of the block co-located with the current MB partition in the RefPicList1[0] of the current block are used to derive the motion vectors. Each motion vector in the co-located block is scaled based on POC distances.

A spatial direct mode can also be performed in AVC. For example, in AVC, a direct mode can also predict motion information from the spatial neighbors.

In HEVC, the largest coding unit in a slice is called a coding tree block (CTB). A CTB contains a quad-tree, the nodes of which are coding units. The size of a CTB can range from 16×16 to 64×64 in the HEVC main profile. In some cases, 8×8 CTB sizes can be supported. A coding unit (CU) could be the same size of a CTB and as small as 8×8. In some cases, each coding unit is coded with one mode. When a CU is inter-coded, the CU may be further partitioned into 2 or 4 prediction units (PUs), or may become just one PU when further partition does not apply. When two PUs are present in one CU, they can be half size rectangles or two rectangles with ¼ or ¾ size of the CU.

When the CU is inter-coded, one set of motion information is present for each PU. In addition, each PU is coded with a unique inter-prediction mode to derive the set of motion information.

For motion prediction in HEVC, there are two inter-prediction modes, including merge mode and advanced motion vector prediction (AMVP) mode for a prediction unit (PU). Skip is considered as a special case of merge. In either AMVP or merge mode, a motion vector (MV) candidate list is maintained for multiple motion vector predictors. The motion vector(s), as well as reference indices in the merge mode, of the current PU are generated by taking one candidate from the MV candidate list. In some examples, as described below, one or more stored local illumination compensation (LIC) flags can be included along with stored motion vectors in a MV candidate list.

In examples where a MV candidate list is used for motion prediction (and where applicable, illumination compensation) of a block, the MV candidate list may be constructed by the encoding device and the decoding device separately. For instance, the MV candidate list can be generated by an encoding device when encoding a block, and can be generated by a decoding device when decoding the block. Information related to motion information candidates in the MV candidate list (e.g. information related to one or more motion vectors, information related to one or more LIC flags which can be stored in the MV candidate list in some cases, and/or other information), can be signaled between the encoding device and the decoding device. For example, in the merge mode, index values to the stored motion information candidates can be signaled from an encoding device to a decoding device (e.g., in a syntax structure, such as the picture parameter set (PPS), sequence parameter set (SPS), video parameter set (VPS), a slice header, a supplemental enhancement information (SEI) message sent in or separately from the video bitstream, and/or other signaling). The decoding device can construct a MV candidate list and use the signaled references or indexes to obtain one or more motion information candidates from the constructed MV candidate list to use for motion compensation prediction. For example, the decoding device 112 may construct a MV candidate list and use a motion vector (and in some cases an LIC flag) from an indexed location for motion prediction of the block. In the case of AMVP mode, in addition to the references or indexes, differences or residual values may also be signaled as deltas. For example, for the AMVP mode, the decoding device can construct one or more MV candidate lists and apply the delta values to one or more motion information candidates obtained using the signaled index values in performing motion compensation prediction of the block.

In some examples, the MV candidate list contains up to five candidates for the merge mode and two candidates for the AMVP mode. In other examples, different numbers of candidates can be included in a MV candidate list for merge mode and/or AMVP mode. A merge candidate may contain a set of motion information. For example, a set of motion information can include motion vectors corresponding to both reference picture lists (list 0 and list 1) and the reference indices. If a merge candidate is identified by a merge index, the reference pictures are used for the prediction of the current blocks, as well as the associated motion vectors are determined. However, under AMVP mode, for each potential prediction direction from either list 0 or list 1, a reference index needs to be explicitly signaled, together with an MVP index to the MV candidate list since the AMVP candidate contains only a motion vector. In AMVP mode, the predicted motion vectors can be further refined.

As can be seen above, a merge candidate corresponds to a full set of motion information, while an AMVP candidate contains just one motion vector for a specific prediction direction and reference index. The candidates for both modes are derived similarly from the same spatial and temporal neighboring blocks.

In some examples, merge mode allows an inter-predicted PU to inherit the same motion vector or vectors, prediction direction, and reference picture index or indices from an inter-predicted PU that includes a motion data position selected from a group of spatially neighboring motion data positions and one of two temporally co-located motion data positions. For AMVP mode, motion vector or vectors of a PU can be predicatively coded relative to one or more motion vector predictors (MVPs) from an AMVP candidate list constructed by an encoder and/or a decoder. In some instances, for single direction inter-prediction of a PU, the encoder and/or decoder can generate a single AMVP candidate list. In some instances, for bi-directional prediction of a PU, the encoder and/or decoder can generate two AMVP candidate lists, one using motion data of spatial and temporal neighboring PUs from the forward prediction direction and one using motion data of spatial and temporal neighboring PUs from the backward prediction direction.

Figure 2:
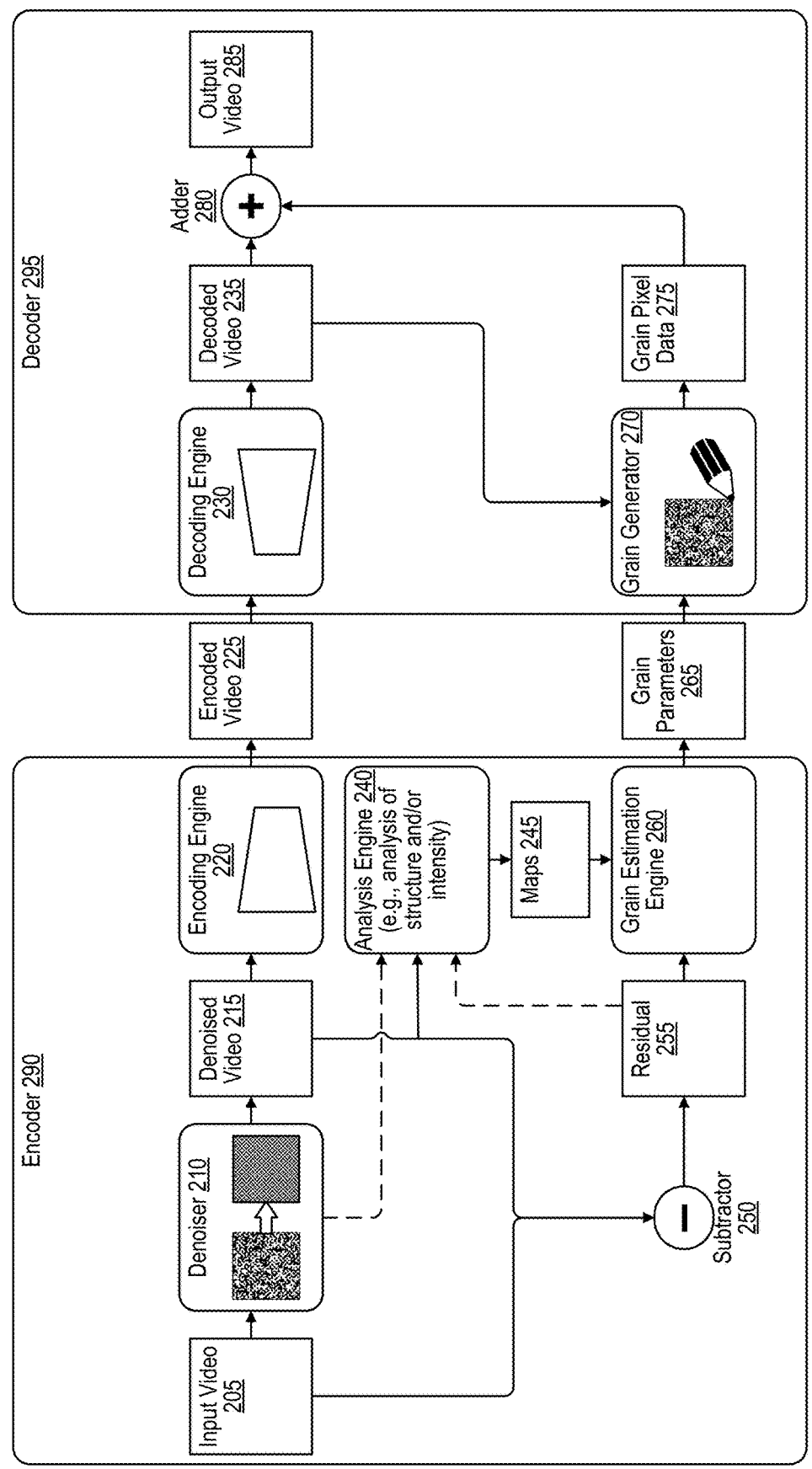
FIG. 2 is a block diagram illustrating a codec system with an encoder that filters out film grain noise and a decoder that reconstructs the film grain noise, in accordance with some examples.

FIG. 2 is a block diagram illustrating a codec system 200 with an encoder 290 that filters out film grain noise and a decoder 295 that reconstructs the film grain noise. The encoder 290 may be an example of the encoding device 104, the encoding engine 106, the computing system 1100, the processor 1110, or a combination thereof. The decoder 295 may be an example of the decoding device 112, the decoder engine 116, the computing system 1100, the processor 1110, or a combination thereof.

The encoder 290 receives an input video 205 with at least one video frame, for instance from a video source 102. The input video 205 includes film grain or other noise data. In some cases, film grain can provide a desirable aesthetic effect in a video, and it can be desirable for film grain to be retained through an encoding and decoding processes. However, the randomness and rapid changes of film grain and other noise data can add complexity to a video and therefore reduce the efficiency of encoding and/or compression. For instance, video compression is based on spatial and temporal prediction, while film grain and other noise data have high degrees of randomness in both spatial and temporal directions, making prediction difficult. Thus, to reduce the complexity of the input video 205 and improve the efficiency of encoding and/or compression of the input video 205, the encoder 290 denoises the input video 205 using a denoiser 210 to generate denoised video 215. The denoiser 210 can use any denoising algorithms or techniques, such as spatial filtering, transform domain filtering, wavelet thresholding, or a combination thereof. The encoder 290 then passes the denoised video 215 to an encoding engine 220 to generate encoded video 225. The encoding engine 220 can be an example of the encoding device 104, the encoding engine 106, the computing system 1100, the processor 1110, or a combination thereof. In some examples, the encoding engine 220 compresses the denoised video 215 to generate the encoded video 225.

The encoder 290 also includes a subtractor 250 that subtracts the denoised video 215 from the input video 205 to generate a residual 255. In some examples, the encoder 290 includes an analysis engine 240 that receives the input video 205, the denoised video 215, data about the denoising process from the denoiser 210, and/or the residual 255. Based on this data, the analysis engine 240 performs an analysis of the structure and/or intensity of the noise that is removed from the input video 205 by the denoiser 210 to generate the denoised video 215. In some examples, the analysis engine 240 generates maps 245 that map out the structure and/or intensity of the noise that is removed from the input video 205 by the denoiser 210 at various positions to a corresponding positions in a video frame of the input video 205, the denoised video 215, and/or the encoded video 225. The encoder 290 includes a grain estimation engine 260 that generates grain parameters 265 based on the maps 245 from the analysis engine 240 and/or based on the residual 255. In some examples, the maps 245 and/or the grain parameters 265 may include an autoregressive model the grain that is removed from the input video 205 by the denoiser 210. In some examples, maps 245 and/or the grain parameters 265 may model grain strength as a function of intensity. In some examples, the grain parameters 265 include an initial random state, and indication of bit depth, an indication of grain scale, or a combination thereof.

The encoder 290 passes the encoded video 225 and the grain parameters 265 to the decoder 295. The decoder 295 includes a decoding engine 230 that decodes the encoded video 225 to generate decoded video 235. The decoding engine 230 may be an example of the decoding device 112, the decoder engine 116, the computing system 1100, the processor 1110, or a combination thereof. In some examples, the decoding engine 230 decompresses the encoded video 225 to generate the decoded video 235. The decoded video 235 is a reconstruction of the denoised video 215.

The decoder 295 also includes a grain generator 270 that generates grain pixel data 275 based on the grain parameters 265. In some examples, the grain pixel data 275 is a reconstruction of the noise that is removed from the input video 205 by the denoiser 210. In some examples, the grain pixel data 275 is a reconstruction of the residual 255. In some examples, the grain pixel data 275 is synthesized grain data that shares some attributes (e.g., indicated by the grain parameters 265) in common with the noise that is removed from the input video 205 by the denoiser 210. The decoder 295 includes an adder 280 that adds the grain pixel data 275 to the decoded video 235 to generate output video 285.

In some examples, the grain generator 270 generates an entire frame of the grain pixel data 275 before the decoder 295 adds the grain pixel data 275 to the decoded video 235 using the adder 280 to generate the output video 285. An example of such a decoder 295 is illustrated as part of the decoder system 600 of FIG. 6.

In some examples, the grain generator 270 generates portions of the frame of grain pixel data 275 at a time dynamically, and the decoder 295 adds the grain pixel data 275 to the to the decoded video 235 a portion at a time dynamically using the adder 280. The decoder 295 can therefore generate the output video 285 a portion at a time dynamically, eventually generating the entire frame of the output video 285 after the grain generator 270 eventually generates the entire frame of the grain pixel data 275. An example of such a decoder 295 is illustrated as part of the decoder system 700 of FIG. 7. Such a decoder 295 can provide efficiency improvements over a decoder that generates the entire frame of the grain pixel data 275 before adding the grain pixel data 275 to the decoded video 235 to generate the output video 285 by allowing parallel grain generation and grain addition. For instance, the adder 280 can add a first portion of the grain pixel data 275 to the decoded video 235 while the grain generator 270 is generating a second portion of the grain pixel data 275, as illustrated in the conceptual diagram 950 of FIG. 9B.

Figure 3:
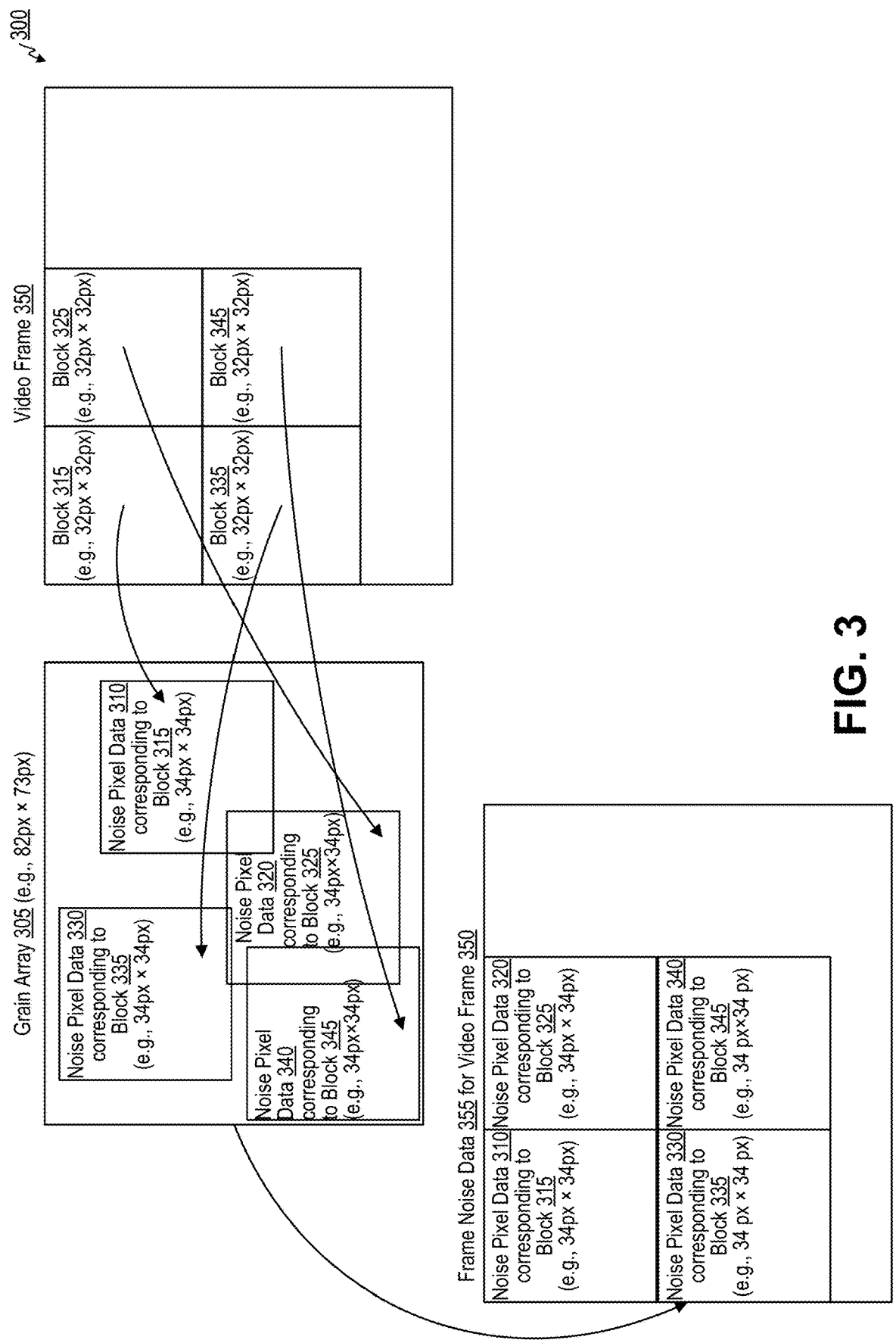
FIG. 3 is a conceptual diagram illustrating generation of noise pixel data corresponding to various blocks of a video frame based on respective offsets, in accordance with some examples.

FIG. 3 is a conceptual diagram 300 illustrating generation of noise pixel data corresponding to various blocks of a video frame 350 based on respective offsets. The grain generator 270 (e.g., using the white noise generator 610 and/or the auto regressive filter 615) generates a grain array 305 based on the grain parameters 265. In the illustrative example of FIG. 3, the grain array 305 has dimensions of 82 pixels (px) by 73 px. In some examples, the grain array 305 may be larger or smaller than this size, in either dimension.

The video frame 350 is divided into multiple blocks. In the illustrative example of FIG. 3, the video frame 350 is divided into at least four blocks, including block 315, block 325, block 335, and block 345. In some examples, the video frame 350 can be divided into more than four blocks or fewer than four blocks. In the illustrative example of FIG. 3, each block of the blocks has dimensions of 32 px by 32 px. In some examples, the blocks (e.g., block 315, block 325, block 335, and block 345) may be larger or smaller than this size, in either dimension.

The grain generator 270 (e.g., using the random offset generator 635 and/or the random offset generator 710) generates random offsets respectively corresponding to each of the blocks of the video frame 350 (e.g., block 315, block 325, block 335, and block 345). Based on the random offsets, the grain generator 270 retrieves, from the grain array 305, noise pixel data 310 corresponding to the block 315, noise pixel data 320 corresponding to the block 325, noise pixel data 330 corresponding to the block 335, and noise pixel data 340 corresponding to the block 345. A set of random offsets for a given block may include a horizontal offset and a vertical offset from an origin point along the grain array 305. The origin point may be a point with coordinates (0, 0) of the grain array 305 at one of the corners of the grain array 305, such as the upper-left corner, the bottom-left corner, the upper-right corner, or the bottom-right corner. A set of random offsets for a given block indicates a position along the grain array 305 that the grain generator 270 is to retrieve noise pixel data corresponding to that block.

Figure 4:
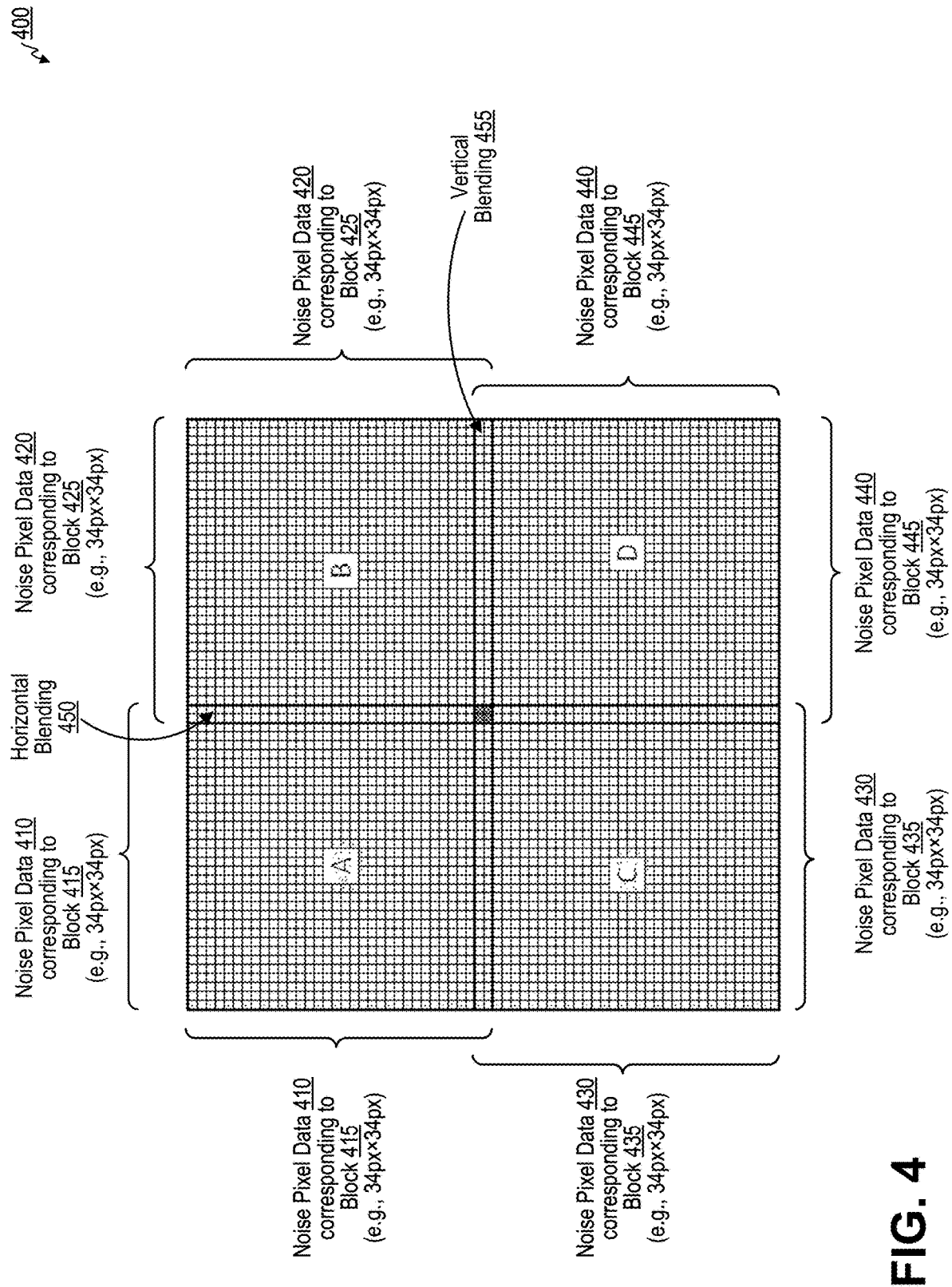
FIG. 4 is a conceptual diagram illustrating use of horizontal blending and vertical blending at overlapping portions of noise pixel data corresponding to different blocks of a video frames, in accordance with some examples.

For instance, the grain generator 270 (e.g., using the random offset generator 635 and/or the random offset generator 710) generates a first set of random offsets corresponding to the block 315, with the first set of random offsets indicating a position along the grain array 305 from which to retrieve the noise pixel data 310 corresponding to the block 315. The grain generator 270 generates a second set of random offsets corresponding to the block 325, with the second set of random offsets indicating a position along the grain array 305 from which to retrieve the noise pixel data 320 corresponding to the block 325. The grain generator 270 generates a third set of random offsets corresponding to the block 335, with the third set of random offsets indicating a position along the grain array 305 from which to retrieve the noise pixel data 330 corresponding to the block 335. The grain generator 270 generates a fourth set of random offsets corresponding to the block 345, with the fourth set of random offsets indicating a position along the grain array 305 from which to retrieve the noise pixel data 340 corresponding to the block 345. In the illustrative example of FIG. 3, each set of noise pixel data (e.g., the noise pixel data 310, the noise pixel data 320, the noise pixel data 330, and the noise pixel data 340) has dimensions of 34 px by 34 px. The additional 2 pixels in each dimension (beyond the 32 px by 32 px dimensions of the blocks) can be used for blending as illustrated in FIG. 4. In some examples, the blocks (e.g., block 315, block 325, block 335, and block 345) may be larger or smaller than this size, in either dimension.

The grain generator 270 can arrange each set of noise pixel data (e.g., the noise pixel data 310, the noise pixel data 320, the noise pixel data 330, and the noise pixel data 340) together according to the same arrangement that the corresponding blocks (e.g., block 315, block 325, block 335, and block 345) have in the video frame 350 to generate frame noise data 355. The frame noise data 355 can represent grain pixel data 275 that the decoder 295 can add to decoded video 235 using the adder 280 to generate output video 285. In some examples, the noise pixel data (e.g., the noise pixel data 310, the noise pixel data 320, the noise pixel data 330, and the noise pixel data 340) can represent grain pixel data 275 that the decoder 295 can add to decoded video 235 using the adder 280 to generate output video 285.

In some examples, the grain array 305 is a luminosity (luma) grain array 305 with grain on a luminosity channel, and the noise pixel data (e.g., noise pixel data 310, noise pixel data 320, noise pixel data 330, and noise pixel data 340) includes noise on the luminosity channel. In some examples, the grain array 305 is a chroma grain array 305 with grain on one or more chroma channels corresponding to one or more colors, and the noise pixel data (e.g., noise pixel data 310, noise pixel data 320, noise pixel data 330, and noise pixel data 340) includes noise on the one or more chroma channels.

FIG. 4 is a conceptual diagram 400 illustrating use of horizontal blending 450 and vertical blending 455 at overlapping portions of noise pixel data corresponding to different blocks of a video frames. For instance, four sets of noise pixel data, with dimensions 34 px by 34 px each, are illustrated in FIG. 4. The four sets of noise pixel data include noise pixel data 410 (labeled "A") that corresponds to a block 415 of a video frame (e.g., of output 110, input 114, input video 205, denoised video 215, encoded video 225, decoded video 235, and/or video frame 350), noise pixel data 420 (labeled "B") that corresponds to a block 425 of the video frame, noise pixel data 430 (labeled "C") that corresponds to a block 435 of the video frame, and noise pixel data 440 (labeled "D") that corresponds to a block 445 of the video frame. The four sets of noise pixel data in FIG. 4 (e.g., noise pixel data 410, noise pixel data 420, noise pixel data 430, and noise pixel data 440) may be examples of the four sets of noise pixel data in FIG. 3 (e.g., noise pixel data 310, noise pixel data 320, noise pixel data 330, and noise pixel data 340), or vice versa. Similarly, the four blocks in FIG. 4 (e.g., block 415, block 425, block 435, and block 445) may be examples of the four blocks in FIG. 3 (e.g., block 315, block 325, block 335, and block 345), or vice versa.

The four sets of noise pixel data in FIG. 4 (e.g., noise pixel data 410, noise pixel data 420, noise pixel data 430, and noise pixel data 440) are arranged so that two adjacent lines of pixels (e.g., rows or columns of pixels) at a given edge of a first set of noise pixel data overlap over two adjacent lines of pixels (e.g., rows or columns of pixels) at a corresponding edge of an second set of noise pixel data that is arranged adjacent to the first set of noise pixel data. For instance, the two rightmost columns of the noise pixel data 410 overlap with the two leftmost columns of the noise pixel data 420, the two rightmost columns of the noise pixel data 430 overlap with the two leftmost columns of the noise pixel data 440, the two bottommost columns of the noise pixel data 410 overlap with the two topmost columns of the noise pixel data 430, and the two bottommost columns of the noise pixel data 420 overlap with the two topmost columns of the noise pixel data 440.

The grain generator 270 can perform horizontal blending 450 (e.g., horizontal blending 640, horizontal and/or vertical blending by the horizontal/vertical blending engine 715) to blend overlapping columns of pixels from different adjacent sets of noise pixel data. For instance, the grain generator 270 can perform the horizontal blending 450 to blend the two rightmost columns of the noise pixel data 410 with the two leftmost columns of the noise pixel data 420, and to blend the two rightmost columns of the noise pixel data 430 with the two leftmost columns of the noise pixel data 440.

The grain generator 270 can perform vertical blending 455 (e.g., vertical blending 645, horizontal and/or vertical blending by the horizontal/vertical blending engine 715) to blend overlapping rows of pixels from different adjacent sets of noise pixel data. For instance, the grain generator 270 can perform the vertical blending 455 to blend the two bottommost columns of the noise pixel data 410 with the two topmost columns of the noise pixel data 430, and to blend the two bottommost columns of the noise pixel data 420 with the two topmost columns of the noise pixel data 430.

In some examples, the grain generator 270 can perform horizontal blending 450 before performing the vertical blending 455 (e.g., as in FIG. 9A), or vice versa. In some examples, the grain generator 270 can perform horizontal blending 450 before performing the vertical blending 455 at least partially in parallel (e.g., as in FIG. 9B). In some examples, to perform the horizontal blending 450 and/or the vertical blending 455, the grain generator 270 can add noise pixel data from the overlapping lines of the two sets of noise pixel data to one another. In some examples, to perform the horizontal blending 450 and/or the vertical blending 455, the grain generator 270 can subtract noise pixel data from the overlapping lines of the two sets of noise pixel data from one another. In some examples, to perform the horizontal blending 450 and/or the vertical blending 455, the grain generator 270 can multiply noise pixel data from the overlapping lines of the two sets of noise pixel data by one another. In some examples, to perform the horizontal blending 450 and/or the vertical blending 455, the grain generator 270 can divide noise pixel data from the overlapping lines of the two sets of noise pixel data by one another. In some examples, to perform the horizontal blending 450 and/or the vertical blending 455, the grain generator 270 can average noise pixel data from the overlapping lines of the two sets of noise pixel data with one another. In some examples, to perform the horizontal blending 450 and/or the vertical blending 455, the grain generator 270 can keep the blended values within a predetermined range, for instance by bringing any blended values that exceed an upper bound threshold down to the upper bound threshold, and by bringing any blended values that are less than a lower bound threshold up to the lower bound threshold.

Figure 5:
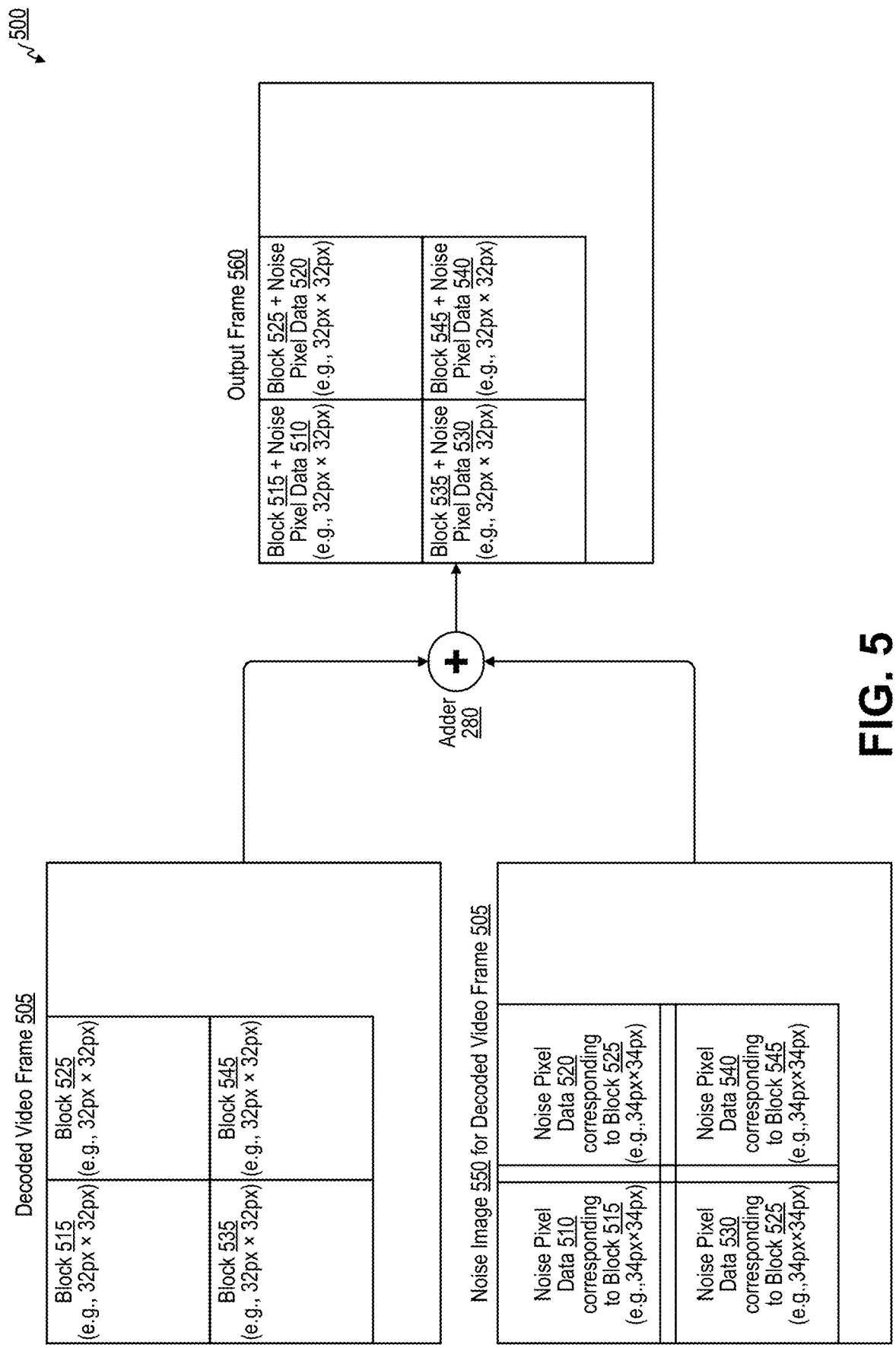
FIG. 5 is a conceptual diagram illustrating addition of a noise image to a decoded video frame using an adder to generate an output frame, in accordance with some examples.

FIG. 5 is a conceptual diagram 500 illustrating addition of a noise image 550 to a decoded video frame 505 using an adder 280 to generate an output frame 560. The decoded video frame 505 is divided into at least four blocks with dimensions 32 px by 32 px, including block 515, block 525, block 535, and block 545. The noise image 550 for the decoded video frame 505 includes four sets of noise pixel data corresponding to the four blocks of the decoded video frame 505, including noise pixel data 510 corresponding to block 515, noise pixel data 520 corresponding to block 525, noise pixel data 530 corresponding to block 535, and noise pixel data 540 corresponding to block 545. The four sets of noise pixel data (e.g., noise pixel data 510, noise pixel data 520, noise pixel data 530, and noise pixel data 540) each have dimensions of 34 px by 34 px, and are arranged in the same order and/or arrangement as the four blocks (e.g., block 515, block 525, block 535, and block 545) with some overlap between adjacent sets of and noise pixel data. The noise image 550 may include horizontal blending 450 and/or vertical blending 455 at the overlapping areas between the adjacent sets of and noise pixel data. In some examples, the noise image 550. In some examples, the grain generator 270 can generate the noise image 550 using piecewise linear interpolation with the corresponding pixels of the decoded video frame 505.

The decoder 295 uses the adder 280 to add the noise image 550 to the decoded video frame 505 to generate the output frame 560. The output frame 560 includes a first 32 px by 32 px block region that includes the noise pixel data 510 of the noise image 550 (e.g., with horizontal blending 450 and/or vertical blending 455 with adjacent set(s) of noise pixel data) added to the block 515 of the decoded video frame 505. The output frame 560 also includes a second block region that includes the noise pixel data 520 of the noise image 550 (e.g., with horizontal blending 450 and/or vertical blending 455 with adjacent set(s) of noise pixel data) added to the block 525 of the decoded video frame 505, a third block region that includes the noise pixel data 530 of the noise image 550 (e.g., with horizontal blending 450 and/or vertical blending 455 with adjacent set(s) of noise pixel data) added to the block 535 of the decoded video frame 505, and a fourth block region that includes the noise pixel data 540 of the noise image 550 (e.g., with horizontal blending 450 and/or vertical blending 455 with adjacent set(s) of noise pixel data) added to the block 545 of the decoded video frame 505. In some examples, the decoder 295 can scale and/or round the noise image 550 before adding the noise image 550 to the decoded video frame 505. In some examples, the decoder 295 can perform piecewise linear interpolation on the noise image 550 with the corresponding pixels of the decoded video frame 505 before adding the noise image 550 to the decoded video frame 505.

Figure 6:
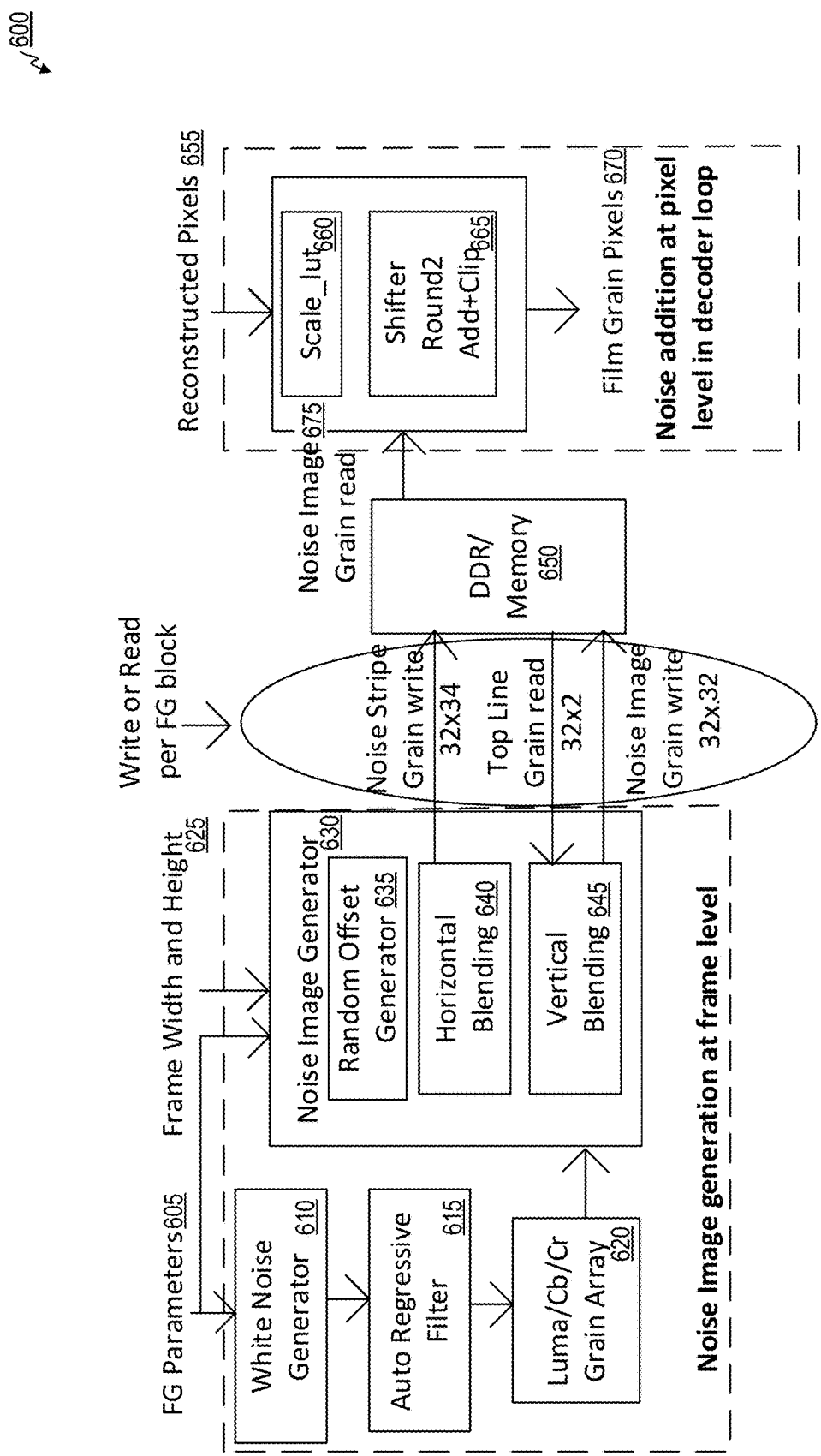
FIG. 6 is a block diagram illustrating a decoder system that generates noise data for an entirety of a video frame before adding the noise data to the video frame, in accordance with some examples.

FIG. 6 is a block diagram illustrating a decoder system 600 that generates noise data for an entirety of a video frame before adding the noise data to the video frame. The decoder system 600 receives film grain (FG) parameters 605, which are an example of the grain parameters 265. The decoder system 600 also receives frame width and height 625 (e.g., frame dimensions) of an encoded video 225 and/or a decoded video 235. The decoded video 235 includes reconstructed pixels 655, which are also received by the decoder system 600.

The decoder system generates a grain array 620 in luma (Y) and/or chroma (e.g., blue-difference (CB) and/or red-difference (CR)) channels based on the FG parameters 605 using a white noise generator 610 and an auto-regressive filter 615. In an illustrative example, the white noise generator 610 generates white noise for the grain array 620 based on the grain parameters 265 according to the Pseudocode 1 below:

| Pseudocode 1 |
|---|
| shift = 12 − BitDepth + grain_scale_shift<br>for ( y = 0; y < 73; y++ ) {<br>for ( x = 0; x < 82; x++ ) {<br>if ( num_y_points > 0 ) {<br>g = Gaussian_Sequence[ get_random_number ( 11 ) ]<br>} else { g = 0 }<br>LumaGrain[ y ][ x ] = Round2( g, shift ) } } |

In Pseudocode 1 for the white noise generator 610 provided above, LumaGrain represents the luma grain array. BitDepth and grain_scale_shift can represent FG parameters 605.

In an illustrative example, the auto-regressive filter 615 generates the grain array 620 based on the white noise (generated using the white noise generator 610) based on the FG parameters 605 according to the Pseudocode 2 below:

| Pseudocode 2 |
|---|
| shift = ar_coeff_shift_minus_6 + 6<br>for ( y = 3; y < 73; y++ ) {<br>for ( x = 3; x < 82 − 3; x++ ) {<br>s = 0; pos = 0<br>for ( deltaRow = −ar_coeff_lag; deltaRow <= 0; deltaRow++ ) {<br>for ( deltaCol = −ar_coeff_lag; deltaCol <= ar_coeff_lag; deltaCol++<br>) {<br>if ( deltaRow == 0 && deltaCol == 0 )<br>break<br>c = ar_coeffs_y_plus_128[ pos ] − 128<br>s += LumaGrain[ y + deltaRow ][ x + deltaCol ] * c<br>pos++ } }<br>LumaGrain [ y ][ x ] =<br>Clip3( GrainMin, GrainMax, LumaGrain[ y ][ x ]<br>+ Round2 ( s, shift ) ) } } |

In Pseudocode 2 for the auto-regressive filter 615 provided above, ar_coeff_lag represents one of the FG parameters 605. In the example illustrated using the pseudocode, each filtered grain value generated using the auto-regressive filter 615 can be dependent on maximum of 24 white noise values and/or filtered grain values given ar_coeff_lag equals to 3. The output of the auto-regressive filter 615 is the grain array 620.

A noise image generator 630 of the decoder system 600 generates a noise image 675 based on the grain array 620, the frame width and height 625, and in some cases the FG parameters 605. The noise image generator 630 includes a random offset generator 635 that generates random offsets for the different sets of noise pixel data (e.g., as in the random offsets for the noise pixel data 310, the noise pixel data 320, the noise pixel data 330, and the noise pixel data 340) to identify which portions of the grain array 620 the noise pixel data should be retrieved from. The noise image generator 630 includes respective engines for horizontal blending 640 (e.g., for horizontal blending 450) and vertical blending 645 (e.g., for vertical blending 455). The horizontal blending 640 and vertical blending 645 can blend overlapping lines of noise pixel data from adjacent sets of noise pixel data as illustrated in FIG. 4. The noise image generator 630 writes the resulting blended noise pixel data to memory 650, which may include double data rate (DDR) memory. The noise image generator 630 can writes the blended noise pixel data from the noise image, and/or from the blended noise stripes, in portions of 32 px by 34 px, 32 px by 2 px, and/or 32 px by 32 px at a time.

The decoder system 600 reads the noise image 675 from the memory 650. The decoder system 600 uses a scaler and scale lookup table (lut) 660 to scale the noise image 675 based on the reconstructed pixels 655 and/or the frame width and height 625. The decoder system 600 uses a shifter/rounder/adder/clipper engine 665 to shift, round, add (e.g., as in adder 280), and/or clip the noise image 675 to the reconstructed pixels 655, to generate film grain pixels 670. The film grain pixels 670 are examples of pixels of the output video 285.

In some examples, the decoder system 600 performs sequential blending of film grain blocks (e.g., noise pixel data 310, noise pixel data 320, noise pixel data 330, noise pixel data 340, noise pixel data 410, noise pixel data 420, noise pixel data 430, noise pixel data 440, noise pixel data 510, noise pixel data 520, noise pixel data 530, noise pixel data 540) horizontally and vertically to generate the noise image 675 for the whole frame. The decoder system 600 writes the full frame width of horizontally blended noise stripes to memory 650. The decoder system 600 performs 2 extra pixel writes after horizontal blending, with 2 top line pixels read, and 2 pixels written after vertical blending for every 32 pixels in height for $$\text{Luma}(W * 6 * \frac{H}{32}).$$

Similarly, the decoder system 600 performs 1 extra pixel write, 1 Top pixel read, and 1 pixel write after vertical blending for every 16 pixels in height for $$\text{Chroma } Cb/Cr(\frac{W}{2} * 6 * \frac{H}{2*16}).$$

In some examples, the memory bandwidth for the memory 650 used by the decoder system 600 to generate the film grain pixels 670 can be determined using the equation:

Memory Bandwidth =                         Equation 1

$$(W * \left(2H + 6 * \frac{H}{32}\right) + \frac{W}{2} * \left(4 * \frac{H}{2} + 6 * \frac{H}{2*16}\right)) * B * F \text{ bits/sec}$$

In equation 1 above, W represents the width of the frame, H represents the height of the frame, B represents bit-depth, and F represents frame rate in frames per second (fps). According to equation 1 above, the read/write memory bandwidth for the memory 650 of the decoder system 600 is 6644 MBps for a 4K resolution at a 240 fps frame rate and an 8-bit bit-depth.

Figure 7:
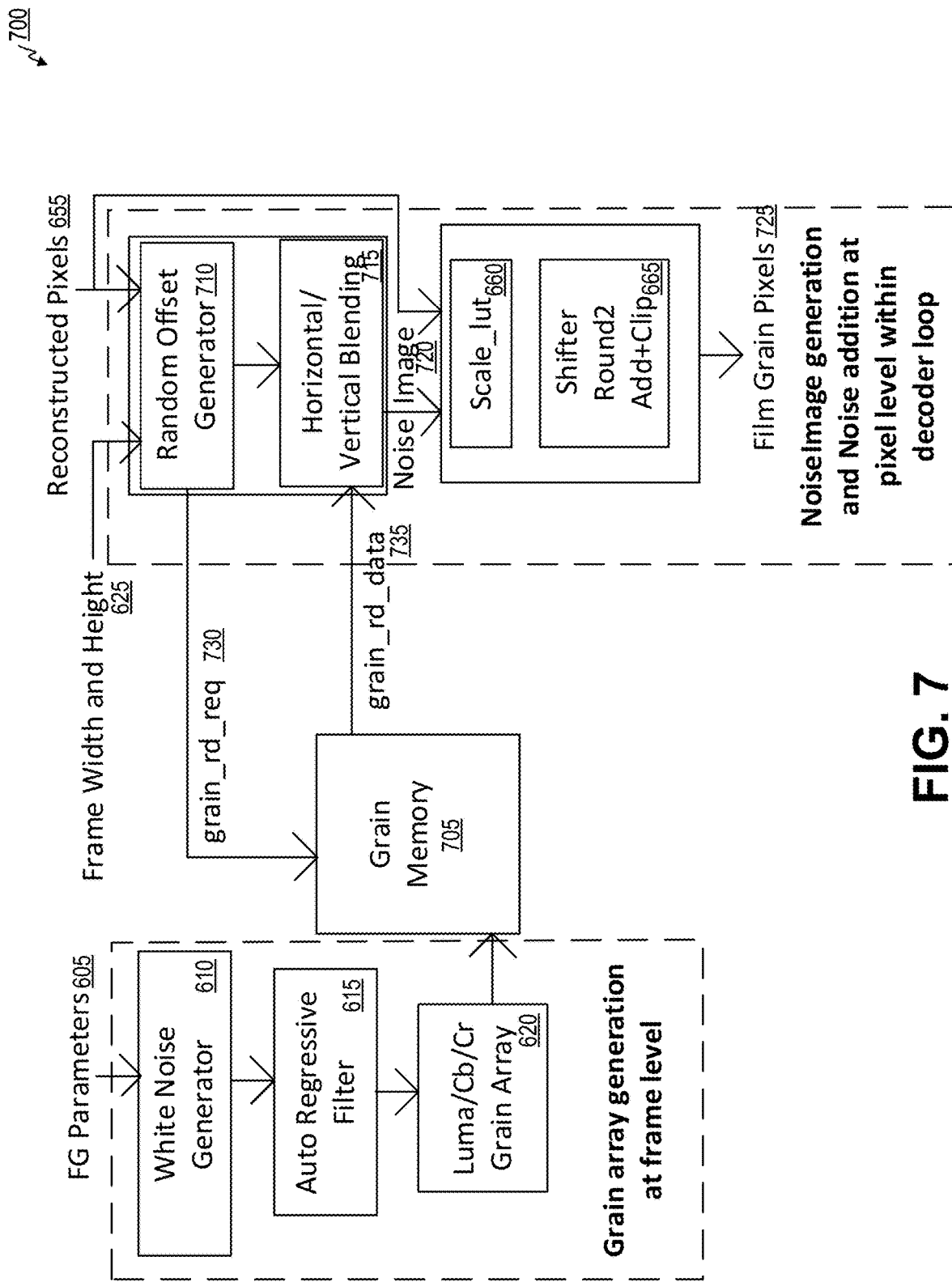
FIG. 7 is a block diagram illustrating a decoder system that generates noise data on a pixel-by-pixel basis and adds the noise data to the video frame on a pixel-by-pixel basis, in accordance with some examples.

FIG. 7 is a block diagram illustrating a decoder system 700 that generates noise data on a pixel-by-pixel basis and adds the noise data to the video frame on a pixel-by-pixel basis. The decoder system 700 generates the grain array 620 as described above with respect to the decoder system 600, using the FG parameters 605, the white noise generator 610, and the auto-regressive filter 615. The decoder system 700 includes a grain memory 705 that stores the grain array 620 in its entirety. Storage of the grain array 620 is the only write operation (or set of write operations) used by the decoder system 700 to generate the film grain pixels 725. This represents a significant reduction in quantity of write operations per frame compared to the various write operations to the memory 650 by the decoder system 600.

The decoder system 700 includes a random offset generator 710 and a horizontal/vertical blending engine 715 (e.g., for horizontal blending 640 and vertical blending 645) that the decoder system 700 uses to generate a noise image 720 using the grain array 620 that is stored in the grain memory 705. The decoder system 700 receives the frame width and height 625, based on which the decoder system 700 sends grain read requests 730 to the grain memory 705, and receives grain read data 735 in response from the grain memory 705. In some examples, the decoder system 700 retrieves the grain read data 735 from the grain memory 705 on a pixel-by-pixel basis as needed based on a position that a given noise pixel is to be in the noise image 720. For instance, if the given noise pixel is in a noise stipe corresponding to an overlap between sets of pixel noise data (e.g., as in the noise stripes for the horizontal blending 450 and/or for the vertical blending 455 in FIG. 4), then the grain read requests 730 can request grain read data 735 from each of the overlapping sets of pixel noise data based on the corresponding random offsets, which the decoder system 700 blends on a per-pixel basis using the horizontal/vertical blending engine 715. If the given noise pixel is not in a noise stipe corresponding to an overlap between sets of pixel noise data, then the grain read requests 730 can request grain read data 735 from just one set of pixel noise data based on the corresponding random offsets, which the decoder system 700 can use as part of the noise image 720. This pixel-by-pixel retrieval of pixel noise/grain data from the grain array 620 stored in the grain memory 705 is illustrated further in FIG. 8.

The decoder system 700 uses a scaler and scale lookup table (lut) 660 to scale the noise image 720 (or a portion thereof) based on the reconstructed pixels 655 and/or the frame width and height 625. The decoder system 700 uses a shifter/rounder/adder/clipper engine 665 to shift, round, add (e.g., as in adder 280), and/or clip the noise image 720 (or a portion thereof) to the reconstructed pixels 655, to generate film grain pixels 725. The film grain pixels 725 are examples of pixels of the output video 285.

Figure 8:
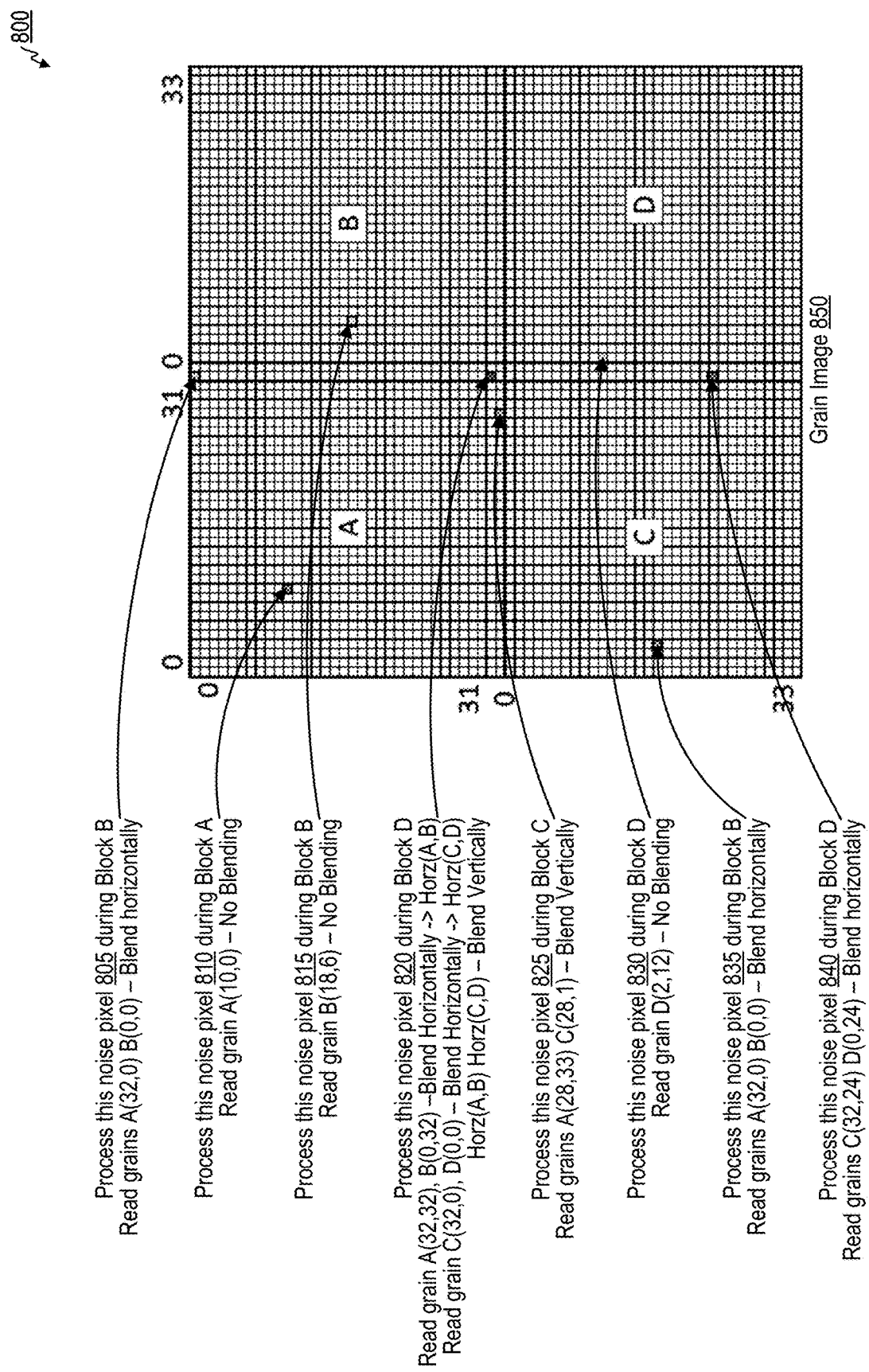
FIG. 8 is a block diagram illustrating generation of noise pixel data based on positions of the noise pixel data in a grain image, in accordance with some examples.

FIG. 8 is a block diagram 800 illustrating generation of noise pixel data based on positions of the noise pixel data in a grain image 850. The decoder system 700 can dynamically retrieve noise pixel data from the grain array 620 stored in the grain memory 705 on the fly, on a pixel-by-pixel basis, using the random offsets and based on the position that the noise pixel data is set to occupy in the grain image 850. The decoder system 700 can dynamically process noise pixel data using horizontal blending and/or vertical blending on the fly, on a pixel-by-pixel basis, based again on the position that the noise pixel data is set to occupy in the grain image

850. In some examples, the decoder system 700 can retrieve and/or process noise pixel data from one noise pixel data block at a time. The grain image 850 includes four noise pixel data blocks, labeled Block A, Block B, Block C, and Block D, respectively. The noise pixel data blocks are examples of the noise pixel data sets described above (e.g., noise pixel data 310, noise pixel data 320, noise pixel data 330, noise pixel data 340, noise pixel data 410, noise pixel data 420, noise pixel data 430, noise pixel data 440, noise pixel data 510, noise pixel data 520, noise pixel data 530, noise pixel data 540).

For example, the decoder system 700 can retrieve and process noise pixel 805 during processing of Block B, by reading noise pixel data from Block A at coordinates (32,0) and from Block B at coordinates (0,0), and blending these noise pixels horizontally. The decoder system 700 can retrieve and process illustrated noise pixel 810 during processing of Block A, by reading noise pixel data from Block A at coordinates (10,0), with no blending required. The decoder system 700 can retrieve and process illustrated noise pixel 815 during processing of Block B, by reading noise pixel data from Block B at coordinates (18,6), with no blending required.

The decoder system 700 can retrieve and process illustrated noise pixel 820 during processing of Block D, by reading noise pixel data from Block A at coordinates (32,32) and reading noise pixel data from B at coordinates (0,32), and blending these noise pixels horizontally to produce horizontally blended intermediate pixel data Horz(A,B). For illustrated noise pixel 820, the decoder can also read noise pixel data from Block C at coordinates (32,0) and from block D at coordinates (0,0), and blend these noise pixels horizontally produce horizontally blended intermediate pixel data Horz(C,D). For illustrated noise pixel 820, the decoder can then vertically blend the intermediate pixel data Horz(A,B) with the intermediate pixel data Horz(C,D).

The decoder system 700 can retrieve and process illustrated noise pixel 825 during processing of Block C, by reading noise pixel data from Block A at coordinates (28,33) C at coordinates (28,1), and blending these noise pixels vertically. The decoder system 700 can retrieve and process illustrated noise pixel 830 during processing of Block D, by reading noise pixel data from Block D at coordinates (2,12), with no blending required. The decoder system 700 can retrieve and process illustrated noise pixel 835 during processing of Block B, by reading noise pixel data from Block A at coordinates (32,0), reading noise pixel data from Block B at coordinates (0,0), and blending these noise pixels horizontally. The decoder system 700 can retrieve and process illustrated noise pixel 840 during processing of Block D, by reading noise pixel data from Block C at coordinates (32,24), reading noise pixel data from Block D at coordinates (0,24), and blending these noise pixels horizontally.

The decoder system 700 dynamically retrieves noise pixel data corresponding to a given reconstructed pixel, generates noise data from the noise pixel data (e.g., by rounding, shifting, clipping, and/or blending the noise pixel data), and applies the noise data to the reconstructed pixel. In an illustrative example, the decoder system 700 performs these operations according to Pseudocode 3 below:

Pseudocode 3

```
lumaNum = 0
rand = 0
rand_top = 0
for ( y = 0; y < (h + 1)/2 ; y += 16 ) {
// y increment by luma 32 / chroma 16 till frame height
for ( x = 0; x < (w + 1)/2; x += 16 ) {
// x increment by luma 32 / chroma 16 till frame width
rand_left = rand // generate current and left random number
RandomRegister_0 = grain_seed
RandomRegister_0 ^= ( (lumaNum * 37 + 178) & 255) << 8
RandomRegister_0 ^= ( (lumaNum * 173 + 105) & 255)
rand = get_random_number_0 ( 8 ) // using RandomRegister_0
offsetX_left = rand_left >> 4
// e.g.,rand_left = 1011_1100, offsetX = 1011 (1011_1100 >> 4)
offsetY_left = rand_left & 15
// e.g.,offsetY = 1100 (1011_1100 && 0000_1111)
offsetX_curr = rand >> 4
offsetY_curr = rand & 15
if ( y > 0 ) { // generate top and top_left random number
lumaNum_minus1 = lumaNum - 1
rand_top_left = rand_top
RandomRegister_1 = grain_seed
RandomRegister_1 ^= ( (lumaNum_minus1 * 37 + 178) & 255) << 8
RandomRegister_1 ^= ( (lumaNum_minus1 * 173 + 105) & 255)
rand_top = get_random_number_1 ( 8 ) // using RandomRegister_1
} // end top and top left random number
offsetX_top_left = rand_top_left >> 4
offsetY_top_left = rand_top_left & 15
offsetX_top = rand_top >> 4
offsetY_top = rand_top & 15
for ( plane = 0 ; plane < NumPlanes; plane++ ) {
// Luma (Plane = 0) /Chroma Cb (Plane = 1) /Chroma Cr (Plane = 2)
planeSubX = ( plane > 0) ? subX : 0
planeSubY = ( plane > 0) ? subY : 0
planeOffsetX_left = planeSubX ? 6 + offset_left : 9 + offsetX_left * 2 // Left Grain block X Offset Address within the Grain Array
planeOffsetY_left = planeSubY ? 6 + offset_left : 9 + offsetY_left * 2 // Left Grain block Y Offset Address within the Grain Array
planeOffsetX_curr= planeSubY ? 6 + offset_curr : 9 + offsetX_curr * 2
// Current Grain block X Offset Address within the Grain Array
planeOffsetY_curr = planeSubY ? 6 + offsetY_curr : 9 + offsetY_curr * 2 // Current Grain block Y Offset Address within the Grain Array
planeOffsetX_top_left = 9 + offsetX_top_left * 2 // Top Left Grain block X Offset Address within the Grain Array
planeOffsetY_top_left = 9 + offsetY_top_left * 2 // Top Left Grain block Y Offset Address within the Grain Array
planeOffsetX_top = 9 + offsetX_top * 2 // Top Grain block X Offset Address within the Grain Array
planeOffsetY_top = 9 + offsetY_top * 2 // Top Grain block Y Offset Address within the Grain Array
for ( i = 0; i < 32 >> planeSubY ; i++ ) { // y increment within 32/16 Film Grain Block
for ( j = 0; j < 32 >> planeSubX ; j++ ) { // x increment within 32/16 Film Grain Block
if ( plane = 0) {
left_g = LumaGrain[ planeOffsetY_left + i ][ planeOffsetX_left + 32 + j ]
curr_g = LumaGrain[ planeOffsetY + i ][ planeOffsetX + j ]
top_left_g = LumaGrain[ planeOffsetY_top_left + 32 + i ][ planeOffsetX_left + 32 + j ]
top_g = LumaGrain[ planeOffsetY_top +
32 + i ][ planeOffsetX_top + j
] }
else if ( plane == 1 ) {
left_g = CbGrain[ planeOffsetY_left + i ][ planeOffsetX_left + 16 + j ]
curr_g = CbGrain[ planeOffsetY + i ][ planeOffsetX + j ]
top_left_g = CbGrain[ planeOffsetY_top_left + 16 + i ][ planeOffsetX_left + 16 + j ]
top_g = CbGrain[ planeOffsetY_top + 16 + i ][ planeOffsetX_top + j ]
}
else {
left_g = CrGrain[ planeOffsetY_left + i ][ planeOffsetX_left + 16 + j ]
curr_g = CrGrain[ planeOffsetY + i ][ planeOffsetX + j ]
top_left_g = CrGrain[ planeOffsetY_top_left + 16 + i ][ planeOffsetX_left + 16 + j ]
top_g = CrGrain[ planeOffsetY_top + 16 + i ][ planeOffsetX_top + j ]
}
```

Pseudocode 3

```
if ( j < 2 && overlap_flag && x > 0 ) { // Horizontal blending 1
where old is left_g
    if ( j == 0 ) {
    if (plane = 0) { horiz_1_g = left_g * 27 + curr_g * 17 }
    else { horiz_1_g = left_g * 23 + curr_g * 22 }
    else { horiz_1_g = left_g * 17 + curr_g * 27 }
    horiz_1_g = Clip3( GrainMin, GrainMax, Round2(horiz_1_g, 5) )
    noiseImage[ plane ][ y ][ x ] = horiz_1_g // Only horizontal
Blending
if ( i < 2 ) { // Horizontal blending 2 where old is top_left_g
    if ( j == 0 ) {
    if (plane = 0) { horiz_2_g = top_left_g * 27 + top_g * 17 }
    else { horiz_2_g = top_left_g * 23 + top_g * 22 }
    else { horiz_2_g = top_left_g * 17 + top_g * 27 }
    horiz_2_g = Clip3( GrainMin, GrainMax, Round2(horiz_2_g, 5) )
    if ( i == 0 ) {
    if ( plane = 0 ) { vert_1_g = horiz_2_g * 27 + horiz_1_g * 17 } //
Vertical blending 2 where old is horiz_2_g
    else { vert_1_g = horiz_2_g * 23 + horiz_1_g * 22 } //
    else { vert_1_g = horiz_2_g * 17 + horiz_1_g * 27 } // Vertical
blending 2 where old is horiz_2_g
    vert_1_g = Clip3( GrainMin, GrainMax, Round2(vert_1_g, 5) )
    noiseImage[ plane ][ y ][ x ] = vert_1_g // Both Horizontal and
Vertical Blending
    } // end Horizontal blending 2
} // end Horizontal blending 1
else if ( i < 2 && overlap_flag && y > 0 ) { // Vertical blending 2
where old is top_g
    if ( i == 0 ) {
    if ( plane = 0 ) { vert_2_g = top_g * 27 + curr_g * 17 }
    else { vert_2_g = top_g * 23 + curr_g * 22 }
    else { vert_2_g = top_g * 17 + curr_g * 27 }
    vert_2_g = Clip3( GrainMin, GrainMax, Round2(vert_2_g, 5) )
    noiseImage[ plane ][ y ][ x ] = vert_2_g // Only Vertical Blending
    } // end Vertical blending 2
else { noiseImage[ plane ][ y ][ x ] = curr_g } // No Blending
} // end plane
} // end x increment
lumaNum ++
} // end y increment
```

In Pseudocode 3 above, the decoder system 700 examines one row of blocks within a frame at a time based on the value of lumaNum. For instance, in the context of FIG. 8, lumaNum==0 refers to the row of blocks that includes blocks A and B, while lumaNum==1 refers to the row of blocks that includes blocks C and D.

The decoder system 700 loops (e.g., using two for loops) along different pixel positions (indicated by coordinates x and y) in the current block within the frame. The frame has a height h and width w. Each block may have a height (h+1)/2 and a width (w+1)/2. In some examples, the block may be 32 pixels by 32 pixels in the luma space, and/or 16 pixels by 16 pixels in the chroma space.

For a given pixel, the decoder system 700 retrieves a value for register RandomRegister_0 based on parameter grain_seed. In some aspects, the parameter grain_seed is an example of grain parameters 265 and/or film grain parameters 605. The decoder system 700 determines a random number value rand using a function get_random_number_0( ) that is shown further below in Pseudocode 4. The decoder system 700 has access to a luma grain array (LumaGrain) and one or more chroma grain arrays (CbGrain, CrGrain).

Within a given row of blocks, the decoder system 700 may reference a current block (indicated by variables with the term "curr"), a left block to the left of the current block (indicated by variables with the term "left"), a top block above the current block (indicated by variables with the term "top"), and/or a top-left block above and to the left of the current block (indicated by variables with the term "top_left"). For instance, if the current block is block D of FIG. 8, then the left block is block C, the top block is block B, and the top-left block is block A. Depending on which block the decoder system 700 is referencing as the current block, some of these may not apply. For instance, if the current block is block B, then the left block is block A, and there is not top block or top-left block.

The decoder system 700 uses the random number value rand to generate offsets in the x and y dimensions that indicate the position of a particular noise pixel in the grain array within, and relative to, a position of a particular set or block of noise pixel data (e.g., noise pixel data 310, noise pixel data 320, noise pixel data 330, noise pixel data 340, noise pixel data 410, noise pixel data 420, noise pixel data 430, noise pixel data 440, noise pixel data 510, noise pixel data 520, noise pixel data 530, or noise pixel data 540) within the grain array. These offsets are determined per block. For instance, the offsets in the x and y dimensions that indicate the position of the particular noise pixel for the current block are indicated as offsetX_curr and 48ffset_curr, respectively. The decoder system 700 may set previously-determined values of rand (determined by the decoder when other blocks were set as the current block) to rand_left, rand top, and/or rand top left, respectively. The decoder system 700 may use these random values to generate offsets in the x and y dimensions for the left block (offset_left and offsetY_left), for the top block (offset_top and offset_top), and/or for the top-left block (offset_top_left and 48ffset top_left), respectively. If lumaNum>0 (e.g., the block is C or D in the context of FIG. 8), the decoder system 700 can determine offset_top, offset_top, offset_top_left, and/or offset_top left. The decoder system 700 can determine these based on a value in register RandomRegister_1 set according to grain_seed and function get_random_number_1( ) that is shown further below in Pseudocode 4.

The decoder system 700 also determines plane offsets that indicate the positions of each respective sets or blocks of noise pixel data (e.g., noise pixel data 310, noise pixel data 320, noise pixel data 330, noise pixel data 340, noise pixel data 410, noise pixel data 420, noise pixel data 430, noise pixel data 440, noise pixel data 510, noise pixel data 520, noise pixel data 530, or noise pixel data 540) within the grain array. These offsets are determined per block. For instance, the offsets in the x and y dimensions that indicate the position of the current set or block of noise pixel data for the current block are indicated as planeOffsetX_curr and planeOffsetY_curr, respectively. The decoder system 700 may similarly determine plane offsets in the x and y dimensions for the left set or block of noise pixel data (planeOffsetX_left and planeOffsetY_left), plane offsets in the x and y dimensions for the top set or block of noise pixel data (planeOffsetX_top and planeOffsetY_top), and/or plane offsets in the x and y dimensions for the top-left set or block of noise pixel data (planeOffsetX_top_left and planeOffsetY_top_left), respectively. Each of these plane offsets may be examples of the offsets of noise pixel data blocks of FIG. 2, offsets generated using the random offset generator 635, and/or offsets generated using the random offset generator 710. Thus, in some examples, the decoder system 700 can determine address of a specific noise pixel within the grain array, for instance, using planeOffsetX_curr+offsetX_curr and planeOffsetY_curr+offsetY_curr, planeOffsetX_left+ offsetX_left and planeOffsetY_left+offsetY_left, planeOffsetX_top+offsetX_top and planeOffsetY_top+offsetY top, and/or planeOffsetX_top left+offsetX_top_left and planeOffsetY_top_left+offsetY top_left.

The decoder system 700 loops through different values of i and j corresponding to x an dy coordinates of different pixels, to determine grain values for those pixels according to at least one of the sets or blocks of noise pixel data. For instance, the decoder system 700 generates curr_g to be the grain value for a pixel indicated by i, j for the current block or set of noise pixel data according to the various plane offsets and/or offsets discussed above. Depending on which block is the current block, the decoder system 700 can also use the various plane offsets and/or offsets discussed above to generate left_g to be the grain value for a pixel indicated by i, j for the left block or set of noise pixel data, top_g to be the grain value for a pixel indicated by i, j for the top block or set of noise pixel data, and/or generate top_left_g to be the grain value for a pixel indicated by i, j for the top-left block or set of noise pixel data.

The decoder system 700 then determines if a current noise pixel whose value the decoder system 700 is determining falls within an overlapping area where two or more blocks or sets of noise pixel data overlap, as in the two columns of pixels in FIGS. 4 and 8 where horizontal blending 450 is performed, or the two rows of pixels in FIGS. 4 and 8 where vertical blending 455 is performed. If so, the decoder system 700 makes sure to obtain noise pixel data for the pixel from each of the applicable blocks or sets of noise pixel data, blends these together, shifts and/or clips and/or rounds the blended value, and outputs the result as part of a noise image (noiseImage). The noise image may be an example of the frame noise data 355, the noise pixel data illustrated in FIG. 4, the noise image 550, the film grain pixels 670, the film grain pixels 725, the grain image 850, or a combination thereof. For instance, for horizontal blending 450 (e.g., noise pixel 825), the decoder system 700 blends curr_g with top_g. For vertical blending 455 (e.g., noise pixels 805, 840), the decoder system 700 blends curr_g with left_g. For situations with both horizontal blending 450 and vertical blending 455 (e.g., noise pixel 820), the decoder system 700 blends curr_g, left_g, top_g, and top_left_g. For pixels that are not in an overlapping region (e.g., noise pixels 810, 815, 830, 835), no blending is required, and thus the decoder can use curr_g without blending. The decoder system 700 continues to traverse its various loops to gradually continue determining more and more values for different pixels of the noiseImage over time. In some examples, the decoder system 700 eventually gnerates the entirety of the noiseImage this way.

In an illustrative example, the functions get_random_number_0( ) and get_random_number_1( ) called in Pseudocode 3 above for generating random values rand and rand top, respectively, can operate according to Pseudocode 4 below:

---
Pseudocode 4
---
```
get_random_number_0 ( bits ) {
r = RandomRegister_0
bit = ( ( (r >> 0) ^ (r >> 1) ^ (r >> 3) ^ (r >> 12) ) & 1
r = (r >> 1) | (bit << 15)
result = (r >> (16 – bits) ) & ( (1 << bits) – 1)
RandomRegister_0 = r return result
}
get_random_number_1 ( bits ) {
r = RandomRegister_1
bit = ( ( (r >> 0) ^ (r >> 1) ^ (r >> 3) ^ (r >> 12) ) & 1
r = (r >> 1) | (bit << 15)
result = (r >> (16 – bits) ) & ( (1 << bits) – 1)
RandomRegister_1 = r return result
}
```
---

It should be understood that the pseudocode examples provided above in Pseudocode 1, Pseudocode 2, Pseudocode 3, and/or Pseudocode 4 are illustrative non-limiting examples of techniques for generating grain array data, dynamically retrieving noise pixel data corresponding to a given reconstructed pixel, and/or generating noise data from the noise pixel data (e.g., by rounding, shifting, clipping, and/or blending the noise pixel data). In some examples, the pseudocode may be modified, rearranged, added to, or removed from. In some examples, for instance, the one or more of the pseudocode examples (e.g., Pseudocode 1, Pseudocode 2, Pseudocode 3, and/or Pseudocode 4) can be configured and/or arranged in a decoder sytem (and/or modified) so that one or more of the operations that the pseudocode provides for performance of (e.g., generating grain array data, dynamically retrieving noise pixel data corresponding to a given reconstructed pixel, and/or generating noise data from the noise pixel data) can be performed in parallel with one or more other operations that the pseudocode provides for performance of, for instance as illustrated in FIG. 9B.

FIG. 9A is a conceptual diagram 900 illustrating a timeline 920 for horizontal blending 905, vertical blending 910, and noise addition 915 using a decoder system 600 that generates noise data for an entirety of a video frame before adding the noise data to the decoded video frame. Because the decoder system 600 performs horizontal blending 905 and vertical blending 910 for the entirety of the video frame to generate the entire noise image before adding the noise image to the decoded video frame, horizontal blending 905, vertical blending 910, and noise addition 915 are performed sequentially rather than in parallel.

FIG. 9B is a conceptual diagram 950 illustrating a timeline 960 for horizontal blending, vertical blending, and noise addition using a decoder system 700 that generates noise data on a pixel-by-pixel basis and adds the noise data to the decoded video frame on a pixel-by-pixel basis. Because the decoder system 700 dynamically performs horizontal blending 905 and vertical blending 910 on the fly, on a pixel by pixel basis, the decoder system 700 is able to perform horizontal blending 905, vertical blending 910, and noise addition 915 in parallel. For instance, once pixel 0 completes horizontal blending 905, the decoder system 700 can perform horizontal blending 905 of pixel 1 while also performing vertical blending 910 of pixel 0 in parallel. After that, the decoder system 700 can perform horizontal blending 905 of pixel 2 while also performing vertical blending 910 of pixel 1 in parallel, and while also performing noise addition 915 of pixel 0 in parallel. After that, the decoder system 700 can perform horizontal blending 905 of pixel 3 while also performing vertical blending 910 of pixel 2 in parallel, and while also performing noise addition 915 of pixel 1 in parallel. This parallelized processing results in significant time savings by the decoder system 700 compared to the decoder system 600.

FIG. 10 is a flow diagram illustrating a codec process 1000. The codec process 1000 may be performed by a codec system. In some examples, the codec system can include, for example, the video source 102, the encoding device 104, the encoding engine 106, the storage 108, the output 110, the communications link 120, the decoding device 112, the input 114, the decoder engine 116, the storage 118, the video destination device 122, the codec system 200, the denoiser 210, the encoding engine 220, the decoding engine 230, the analysis engine 240, the subtractor 250, the grain estimation engine 260, the grain generator 270, the adder 280, the encoder 290, the decoder 295, the decoder system 600, the decoder system 700, the computing system 1100, the processor 1110, an apparatus, a non-transitory computer-readable medium that stores instructions for execution by one or more processors, a mobile handset, a head-mounted display (HMD), a wireless communication device, or a combination thereof.

At operation 1005, the codec system is configured to, and can, retrieve, from the grain array stored within the on-chip memory, noise pixel data associated with at least one reconstructed video pixel. Examples of the grain array include the grain pixel data 275, the grain array 305, the grain array 620, or a combination thereof. Examples of the on-chip memory include the storage 118 and/or the grain memory 705. Examples of the noise pixel data includes at least one pixel of any of: the grain pixel data 275, the noise pixel data 310, the noise pixel data 320, the noise pixel data 330, the noise pixel data 340, the frame noise data 355, the noise pixel data 410, the noise pixel data 420, the noise pixel data 430, the noise pixel data 440, the noise pixel data 510, the noise pixel data 520, the noise pixel data 530, the noise pixel data 540, the noise image 675, the grain read data 735, the noise pixels 805-840, or a combination thereof. Examples of the at least one reconstructed video pixel include at least one pixel of any of: the decoded video 235, the video frame 350, the block 315, the block 325, the block 335, the block 345, the decoded video frame 505, the block 515, the block 525, the block 535, the block 545, the reconstructed pixels 655, or a combination thereof.

In some aspects, the grain array is a luminosity grain array, and the noise pixel data includes luminosity noise pixel data. In some aspects, the grain array is a chroma grain array, and the noise pixel data includes chroma noise pixel data.

In some aspects, the codec system is configured to, and can, generate the grain array using a grain parameter (e.g., grain parameters 265, FG parameters 605). The grain parameter is determined based on video data (e.g., input video 205, denoised video 215, encoded video 225, and/or video frame 350). The at least one reconstructed video pixel is configured to reconstruct a pixel of the video data. In some aspects, the codec system is configured to, and can, store the grain array in the on-chip memory.

In some aspects, the codec system is configured to, and can, identify a position of the noise pixel data in the grain array based on an offset to retrieve the noise pixel data. The offset corresponds to a block that the at least one reconstructed video pixel is part of. Examples of the offset include the offsets indicating the positions of the noise pixel data 310, 320, 330, and 340 within the gran array 305 in FIG. 3. Other examples of the offset include offsets generated using the random offset generator 635 and/or the random offset generator 710, offsets including the text "PlaneOffsetX" in Pseudocode 3, offsets including the text "PlaneOffsetY" in Pseudocode 3, offsets including the text "OffsetX" in Pseudocode 3, offsets including the text "OffsetY" in Pseudocode 3, or combinations thereof. In some aspects, the offset is determined based on a randomly generated value (e.g., from the random offset generator 635 and/or the random offset generator 710). In some aspects, the offset is determined based on a frame size (e.g., frame width, frame height, or both) of a video frame (e.g., of the input video 205, denoised video 215, encoded video 225, and/or video frame 350). Examples of the frame size include the frame width and height 625. The at least one reconstructed video pixel is configured to reconstruct at least one pixel of the video frame. In some aspects, the block is based on the frame size. For instance, the size and position(s) of the block may depend on the frame size.

At operation 1010, the codec system is configured to, and can, apply noise data to the at least one reconstructed video pixel to generate at least one output video pixel, wherein the noise data is determined based on the noise pixel data. Examples of the noise data include at least one pixel of any of: the grain pixel data 275, the noise pixel data 310, the noise pixel data 320, the noise pixel data 330, the noise pixel data 340, the frame noise data 355, the noise pixel data 410, the noise pixel data 420, the noise pixel data 430, the noise pixel data 440, the horizontal blending 450, the vertical blending 455, the noise pixel data 510, the noise pixel data 520, the noise pixel data 530, the noise pixel data 540, the horizontal blending 640, the vertical blending 645, a scaler, the shifter/rounder/adder/clipper engine 665, the film grain pixels 670, horizontal and/or vertical blending by the horizontal/vertical blending engine 715, the film grain pixels 725, the noise pixels 805-840, or a combination thereof. Examples of the at least one output video pixel include at least one pixel of: the output video 285, the output frame 560, the noise addition 915, or a combination thereof.

In some aspects, the codec system is configured to, and can, retrieve secondary noise pixel data from the grain array stored within the on-chip memory. The secondary noise pixel data is associated with the at least one reconstructed video pixel. The noise data of operation 1010 is determined based on the noise pixel data and the secondary noise pixel data. In some aspects, the codec system is configured to, and can, blend the noise pixel data and the secondary noise pixel data to determine the noise data. At least one position of the at least one reconstructed video pixel in a video frame corresponds to an overlapping region in which a plurality of blocks of the video frame are arranged to overlap. For instance, if the position of the at least one reconstructed video pixel corresponds to overlapping areas such as the columns of pixels in the area for horizontal blending 450 and/or the rows of pixels in the area for vertical blending 455, the codec system can retrieve noise pixel data corresponding to multiple blocks, and can blend the retrieved noise pixel data to generate the noise data of operation 1010. Further examples include noise pixel 805 (with noise pixel data from Block A and Block B blended together), noise pixel 820 (with noise pixel data from Blocks A, B, C, and D blended together), noise pixel 825 (with noise pixel data from Blocks A and C blended together), and noise pixel 825 (with noise pixel data from Blocks C and D blended together).

In some aspects, the codec system is configured to, and can, apply the noise data to the at least one reconstructed video pixel while determining secondary noise data based on secondary noise pixel data. The secondary noise pixel data is retrieved from the grain array stored within the on-chip memory. The secondary noise pixel data associated with at least a second reconstructed video pixel. For instance, in the context of FIG. 9B, the codec system can perform noise addition 915 for one pixel (e.g., pixel 0) while performing horizontal blending 905 for another pixel (e.g., pixel 2) and/or while performing vertical blending 910 for another pixel (e.g., pixel 1).

In some aspects, the codec system is configured to, and can, apply the noise data to the at least one reconstructed video pixel while retrieving, from the grain array stored within the on-chip memory, secondary noise pixel data associated with at least a second reconstructed video pixel. For instance, in the context of FIG. 9B, the codec system can perform noise addition 915 for one pixel (e.g., pixel 0) while retrieving secondary noise pixel data for another pixel (e.g., pixel 1, pixel 2, or pixel 3) to be blended (via horizontal blending 905 and/or vertical blending 910) with the noise pixel data.

In some aspects, the codec system is configured to, and can, determine the noise pixel data while retrieving, from the grain array stored within the on-chip memory, secondary noise pixel data associated with at least a second reconstructed video pixel. For instance, in the context of FIG. 9B, the codec system can perform horizontal blending 905 for one pixel (e.g., pixel 2) while retrieving secondary noise pixel data for another pixel (e.g., pixel 3). Similarly, in the context of FIG. 9B, the codec system can perform vertical blending 910 for one pixel (e.g., pixel 1) while retrieving secondary noise pixel data for another pixel (e.g., pixel 2 or pixel 3).

In some aspects, codec system is configured to, and can, perform certain operations on a pixel-by-pixel basis. For instance, the codec system can perform, on a pixel-by-pixel basis, retrieval of noise pixel data from the grain array stored within the on-chip memory (as in operation 1005), determining noise data based on the noise pixel data (e.g., including blending, for instance), and/or applying the noise data to the at least one reconstructed video pixel (e.g., as in operation 1010).

In some aspects, the codec system is configured to, and can, apply a scaling factor to the at least one output video pixel, round a pixel value of the at least one output video pixel, clip a pixel value of the at least one output video pixel, or some combination thereof (e.g., using the scale lookup table (lut) 660 and/or the shifter/rounder/adder/clipper engine 665).

In some aspects, at least one memory is configured to store the at least one reconstructed video pixel. In some aspects, the codec system is configured to, and can, store the at least one reconstructed video pixel in the at least one memory. In some aspects, the codec system is configured to, and can, output the at least one output video pixel for storage in at least one memory. In some aspects, the codec system includes a display (e.g., video destination device 122, output device 1135) that is configured to display the at least one output video pixel. In some aspects, the codec system includes a communication interface that is configured to transmit the at least one output video pixel to a recipient device.

In some aspects, the codec system is configured to, and can, encode (e.g., using the encoding device 104, the encoding engine 106, the encoder 290, and/or the encoding engine 220) video data (e.g., video source 102, input video 205, and/or denoised video 215) to generate encoded video data (e.g., output 110, input 114, encoded video 225) and decode (e.g., using the decoding device 112, the decoder engine 116, the decoder 295, and/or the decoding engine 230) at least the encoded video data to generate the at least one reconstructed video pixel.

In some aspects, the codec system is associated with an AOMedia Video 1 (AV1) format, an AV1 codec, an AV1 encoder, an AV1 decoder, or a combination thereof.

In some examples, the imaging system can includes: means for retrieving, from a grain array stored within an on-chip memory that is part of a processor, noise pixel data associated with at least one reconstructed video pixel; and means for applying noise data to the at least one reconstructed video pixel to generate at least one output video pixel, wherein the noise data is determined based on the noise pixel data In some examples, the means for retrieving the noise pixel data includes the decoding device 112, the decoder engine 116, the decoder 295, the grain generator 270, the decoder system 600 (e.g., via the noise image grain read 675 and/or the other grain reads from the DDR/memory 650), the DDR/memory 650, the noise image generator 630, the random offset generator 635, the decoder system 700 (e.g., via the grain read request 730 and/or the grain read data 735), the grain memory 705, the computing system 1100, or a combination thereof.

In some examples, the means for applying the noise data to the at least one reconstructed video pixel includes the decoding device 112, the decoder engine 116, the decoder 295, the decoding engine 230, the grain generator 270, the adder 280, the decoder system 600, the noise image generator 630, engine(s) for the horizontal blending 640, engine(s) for the vertical blending 645, the scale lookup table (lut) 660, the shifter/rounder/adder/clipper engine 665, the decoder system 700, the horizontal/vertical blending engine 715, the computing system 1100, or a combination thereof.

In some examples, the processes described herein (e.g., the respective processes of FIGS. 1, 2, 3, 5, 6, 7, 8, the process 1000 of FIG. 10, and/or other processes described herein) may be performed by a computing device or apparatus. In some examples, the processes described herein can be performed by, and/or using, the video source 102, the encoding device 104, the encoding engine 106, the storage 108, the output 110, the communications link 120, the decoding device 112, the input 114, the decoder engine 116, the storage 118, the video destination device 122, the codec system 200, the denoiser 210, the encoding engine 220, the decoding engine 230, the analysis engine 240, the subtractor 250, the grain estimation engine 260, the grain generator 270, the adder 280, the encoder 290, the decoder 295, the decoder system 600, the decoder system 700, the computing system 1100, the processor 1110, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes. In some examples, performance of certain operations described herein can be responsive to performance of other operations described herein.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
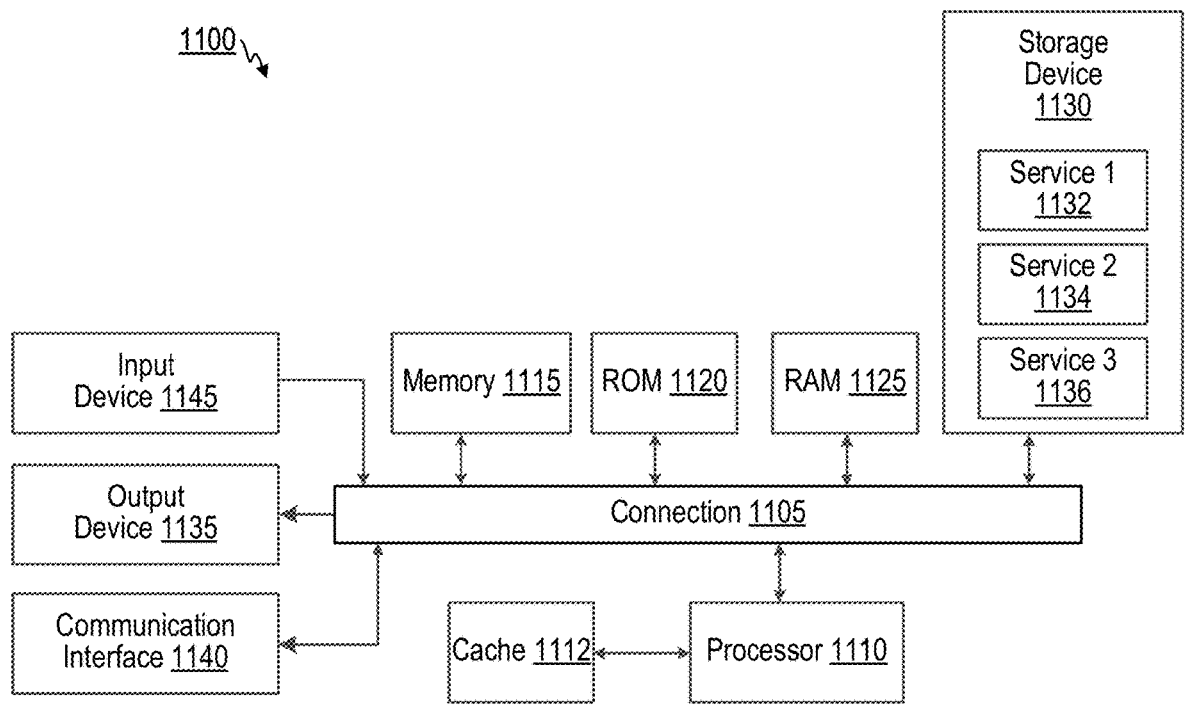
FIG. 11 is a diagram illustrating an example of a computing system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1102.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for video decoding, the apparatus comprising: at least one memory; and at least one processor, including an on-chip memory storing a grain array, the at least one processor configured to: retrieve, from the grain array stored within the on-chip memory, noise pixel data associated with at least one reconstructed video pixel; and apply noise data to the at least one reconstructed video pixel to generate at least one output video pixel, wherein the noise data is determined based on the noise pixel data.

Aspect 2. The apparatus of Aspect 1, wherein the at least one processor is configured to: retrieve secondary noise pixel data from the grain array stored within the on-chip memory, the secondary noise pixel data associated with the at least one reconstructed video pixel, wherein the noise data is determined based on the noise pixel data and the secondary noise pixel data.

Aspect 3. The apparatus of Aspect 2, wherein the at least one processor is configured to: blend the noise pixel data and the secondary noise pixel data to determine the noise data, wherein at least one position of the at least one reconstructed video pixel in a video frame corresponds to an overlapping region in which a plurality of blocks of the video frame are arranged to overlap.

Aspect 4. The apparatus of any of Aspects 1 to 3, wherein the at least one processor is configured to: generate the grain array using a grain parameter, the grain parameter determined based on video data, wherein the at least one reconstructed video pixel is configured to reconstruct a pixel of the video data.

Aspect 5. The apparatus of any of Aspects 1 to 4, wherein the at least one processor is configured to: store the grain array in the on-chip memory.

Aspect 6. The apparatus of any of Aspects 1 to 5, wherein the at least one processor is configured to: identify a position of the noise pixel data in the grain array based on an offset to retrieve the noise pixel data, wherein the offset corresponds to a block that the at least one reconstructed video pixel is part of.

Aspect 7. The apparatus of Aspect 6, wherein the offset is determined based on a randomly generated value.

Aspect 8. The apparatus of any of Aspects 6 to 7, wherein the offset is determined based on a frame size of a video frame, wherein the at least one reconstructed video pixel is configured to reconstruct at least one pixel of the video frame.

Aspect 9. The apparatus of Aspect 8, wherein the block is based on the frame size.

Aspect 10. The apparatus of any of Aspects 1 to 9, wherein the at least one processor is configured to: apply the noise data to the at least one reconstructed video pixel while determining secondary noise data based on secondary noise pixel data, the secondary noise pixel data retrieved from the grain array stored within the on-chip memory, the secondary noise pixel data associated with at least a second reconstructed video pixel.

Aspect 11. The apparatus of any of Aspects 1 to 10, wherein the at least one processor is configured to: from the grain array stored within the on-chip memory, secondary noise pixel data associated with at least a second reconstructed video pixel.

Aspect 12. The apparatus of any of Aspects 1 to 11, wherein the at least one processor is configured to: from the grain array stored within the on-chip memory, secondary noise pixel data associated with at least a second reconstructed video pixel.

Aspect 13. The apparatus of any of Aspects 1 to 12, wherein the noise pixel data is configured to be retrieved from the grain array stored within the on-chip memory on a pixel-by-pixel basis.

Aspect 14. The apparatus of any of Aspects 1 to 13, wherein the noise data is configured to be determined based on the noise pixel data on a pixel-by-pixel basis.

Aspect 15. The apparatus of any of Aspects 1 to 14, wherein the noise data is configured to be applied to the at least one reconstructed video pixel on a pixel-by-pixel basis.

Aspect 16. The apparatus of any of Aspects 1 to 15, wherein the grain array is a luminosity grain array, and wherein the noise pixel data includes luminosity noise pixel data.

Aspect 17. The apparatus of any of Aspects 1 to 16, wherein the grain array is a chroma grain array, and wherein the noise pixel data includes chroma noise pixel data.

Aspect 18. The apparatus of any of Aspects 1 to 17, wherein the at least one processor is configured to: apply a scaling factor to the at least one output video pixel.

Aspect 19. The apparatus of any of Aspects 1 to 18, wherein the at least one processor is configured to: round a pixel value of the at least one output video pixel.

Aspect 20. The apparatus of any of Aspects 1 to 19, wherein the at least one processor is configured to: clip a pixel value of the at least one output video pixel.

Aspect 21. The apparatus of any of Aspects 1 to 20, wherein the at least one memory is configured to store the at least one reconstructed video pixel.

Aspect 22. The apparatus of any of Aspects 1 to 21, wherein the at least one processor is configured to: output the at least one output video pixel for storage in the at least one memory.

Aspect 23. The apparatus of any of Aspects 1 to 22, further comprising: a display configured to display the at least one output video pixel.

Aspect 24. The apparatus of any of Aspects 1 to 23, further comprising: a communication interface configured to transmit the at least one output video pixel to a recipient device.

Aspect 25. The apparatus of any of Aspects 1 to 24, wherein the at least one processor is configured to: encode video data to generate encoded video data; and decode at least the encoded video data to generate the at least one reconstructed video pixel.

Aspect 26. The apparatus of any of Aspects 1 to 25, wherein the apparatus includes at least one of a head-mounted display (HMD), a mobile handset, or a wireless communication device.

Aspect 27. A method for video decoding, the method comprising: retrieving, from a grain array stored within an on-chip memory that is part of a processor, noise pixel data associated with at least one reconstructed video pixel; and applying noise data to the at least one reconstructed video pixel to generate at least one output video pixel, wherein the noise data is determined based on the noise pixel data.

Aspect 28. The method of Aspect 27, further comprising: retrieving secondary noise pixel data from the grain array stored within the on-chip memory, the secondary noise pixel data associated with the at least one reconstructed video pixel, wherein the noise data is determined based on the noise pixel data and the secondary noise pixel data.

Aspect 29. The method of Aspect 28, further comprising: blending the noise pixel data and the secondary noise pixel data to determine the noise data, wherein at least one position of the at least one reconstructed video pixel in a video frame corresponds to an overlapping region in which a plurality of blocks of the video frame are arranged to overlap.

Aspect 30. The method of any of Aspects 27 to 29, further comprising: generating the grain array using a grain parameter, the grain parameter determined based on video data, wherein the at least one reconstructed video pixel is configured to reconstruct a pixel of the video data.

Aspect 31. The method of any of Aspects 27 to 30, further comprising: storing the grain array in the on-chip memory.

Aspect 32. The method of any of Aspects 27 to 31, further comprising: identifying a position of the noise pixel data in the grain array based on an offset to retrieve the noise pixel data, wherein the offset corresponds to a block that the at least one reconstructed video pixel is part of.

Aspect 33. The method of Aspect 32, wherein the offset is determined based on a randomly generated value.

Aspect 34. The method of any of Aspects 32 to 33, wherein the offset is determined based on a frame size of a video frame, wherein the at least one reconstructed video pixel is configured to reconstruct at least one pixel of the video frame.

Aspect 35. The method of Aspect 34, wherein the block is based on the frame size.

Aspect 36. The method of any of Aspects 27 to 35, further comprising: applying the noise data to the at least one reconstructed video pixel while determining secondary noise data based on secondary noise pixel data, the secondary noise pixel data retrieved from the grain array stored within the on-chip memory, the secondary noise pixel data associated with at least a second reconstructed video pixel.

Aspect 37. The method of any of Aspects 27 to 36, further comprising: from the grain array stored within the on-chip memory, secondary noise pixel data associated with at least a second reconstructed video pixel.

Aspect 38. The method of any of Aspects 27 to 37, further comprising: from the grain array stored within the on-chip memory, secondary noise pixel data associated with at least a second reconstructed video pixel.

Aspect 39. The method of any of Aspects 27 to 38, wherein the noise pixel data is configured to be retrieved from the grain array stored within the on-chip memory on a pixel-by-pixel basis.

Aspect 40. The method of any of Aspects 27 to 39, wherein the noise data is configured to be determined based on the noise pixel data on a pixel-by-pixel basis.

Aspect 41. The method of any of Aspects 27 to 40, wherein the noise data is configured to be applied to the at least one reconstructed video pixel on a pixel-by-pixel basis.

Aspect 42. The method of any of Aspects 27 to 41, wherein the grain array is a luminosity grain array, and wherein the noise pixel data includes luminosity noise pixel data.

Aspect 43. The method of any of Aspects 27 to 42, wherein the grain array is a chroma grain array, and wherein the noise pixel data includes chroma noise pixel data.

Aspect 44. The method of any of Aspects 27 to 43, further comprising: applying a scaling factor to the at least one output video pixel.

Aspect 45. The method of any of Aspects 27 to 44, further comprising: rounding a pixel value of the at least one output video pixel.

Aspect 46. The method of any of Aspects 27 to 45, further comprising: clipping a pixel value of the at least one output video pixel.

Aspect 47. The method of any of Aspects 27 to 46, wherein at least one memory is configured to store the at least one reconstructed video pixel.

Aspect 48. The method of any of Aspects 27 to 47, further comprising: outputting the at least one output video pixel for storage in at least one memory.

Aspect 49. The method of any of Aspects 27 to 48, further comprising: causing a display to display the at least one output video pixel.

Aspect 50. The method of any of Aspects 27 to 49, further comprising: causing a communication interface to transmit the at least one output video pixel to a recipient device.

Aspect 51. The method of any of Aspects 27 to 50, further comprising: encoding video data to generate encoded video data; and decoding at least the encoded video data to generate the at least one reconstructed video pixel.

Aspect 52. The method of any of Aspects 27 to 51, wherein the method is performed using an apparatus that includes at least one of a head-mounted display (HMD), a mobile handset, or a wireless communication device.

Aspect 53: A non-transitory computer-readable medium having stored thereon instructions that, when executed by at least one processor having an on-chip memory, cause the at least one processor to: retrieve, from a grain array stored within the on-chip memory, noise pixel data associated with at least one reconstructed video pixel; and apply noise data to the at least one reconstructed video pixel to generate at least one output video pixel, wherein the noise data is determined based on the noise pixel data.

Aspect 54: The non-transitory computer-readable medium of Aspect 53, further comprising operations according to any of Aspects 2 to 26, and/or any of Aspects 28 to 52.

Aspect 55: An apparatus for video decoding, the apparatus comprising: means for retrieving, from a grain array stored within an on-chip memory that is part of a processor, noise pixel data associated with at least one reconstructed video pixel; and means for applying noise data to the at least one reconstructed video pixel to generate at least one output video pixel, wherein the noise data is determined based on the noise pixel data.

Aspect 56: The apparatus of Aspect 55, further comprising means for performing operations according to any of Aspects 2 to 26, and/or any of Aspects 28 to 52.

What is claimed is:

1. An apparatus for video decoding, the apparatus comprising:
    at least one memory; and
    at least one processor, the at least one processor configured to:
        retrieve, from a stored grain array, noise pixel data associated with at least one reconstructed video pixel, wherein the noise pixel data includes at least a first block of noise pixel data and a second block of noise pixel data, wherein the first block of noise pixel data and the second block of noise pixel data both have a first size, and wherein the first size is based on a second size of a block of reconstructed video data that includes the at least one reconstructed video pixel;
        blend a first line of noise pixels from the first block of noise pixel data and a second line of noise pixels from the second block of noise pixel data to generate blended noise data; and
        apply the blended noise data to the at least one reconstructed video pixel to generate at least one output video pixel.

2. The apparatus of claim 1, wherein the first block of noise pixel data and the second block of noise pixel data overlap at an overlap region, and wherein the overlap region includes a first line of noise pixels from the first block of noise pixel data and a second line of noise pixels from the second block of noise pixel data, wherein the first block of noise pixel data and the second block of noise pixel data are adjacent to one another in a first direction with the overlap region between the first block of noise pixel data and the second block of noise pixel data, wherein the first line of noise pixels from the first block of noise pixel data and the second line of noise pixels from the second block of noise pixel data are both arranged in a second direction that is perpendicular to the first direction.

3. The apparatus of claim 2, wherein the noise pixel data includes a third block of noise pixel data and a fourth block of noise pixel data, wherein the third block of noise pixel data and the fourth block of noise pixel data are adjacent to one another in the first direction with a second overlap region between the third block of noise pixel data and the fourth block of noise pixel data, wherein the blended noise data includes a second blended line of noise pixels corresponding to the second overlap region that is arranged in the second direction, wherein the first block of noise pixel data and the third block of noise pixel data are adjacent to one another in the second direction with a third overlap region between the first block of noise pixel data and the third block of noise pixel data, wherein the blended noise data includes a third blended line of noise pixels corresponding to the third overlap region that is arranged in the first direction, wherein the second block of noise pixel data and the fourth block of noise pixel data are adjacent to one another in the second direction with a fourth overlap region between the first block of noise pixel data and the third block of noise pixel data, and wherein the blended noise data includes a fourth blended line of noise pixels corresponding to the fourth overlap region that is arranged in the first direction.

4. The apparatus of claim 1, wherein the at least one processor is configured to:
generate the stored grain array using a grain parameter, the grain parameter determined based on video data, wherein the at least one reconstructed video pixel is configured to reconstruct a pixel of the video data.

5. The apparatus of claim 1, wherein, to retrieve the noise pixel data from the stored grain array, the at least one processor is configured to:
retrieve the noise pixel data from an on-chip memory, wherein the on-chip memory stores the stored grain array.

6. The apparatus of claim 1, wherein the at least one processor is configured to:
identify a position of the noise pixel data in the stored grain array based on an offset to retrieve the first block of noise pixel data, wherein the offset corresponds to a block that the at least one reconstructed video pixel is part of.

7. The apparatus of claim 6, wherein the offset is determined based on a randomly generated value.

8. The apparatus of claim 6, wherein the offset is determined based on a frame size of a video frame, wherein the at least one reconstructed video pixel is configured to reconstruct at least one pixel of the video frame.

9. The apparatus of claim 8, wherein the block is based on the frame size.

10. The apparatus of claim 1, wherein the at least one processor is configured to:
apply the blended noise data to the at least one reconstructed video pixel while determining secondary noise data based on secondary noise pixel data, the secondary noise pixel data retrieved from the stored grain array, the secondary noise pixel data associated with at least a second reconstructed video pixel.

11. The apparatus of claim 1, wherein the at least one processor is configured to:
apply the blended noise data to the at least one reconstructed video pixel while retrieving, from the stored grain array, secondary noise pixel data associated with at least a second reconstructed video pixel.

12. The apparatus of claim 1, wherein the at least one processor is configured to:
determine the noise pixel data while retrieving, from the stored grain array, secondary noise pixel data associated with at least a second reconstructed video pixel.

13. The apparatus of claim 1, wherein the noise pixel data is configured to be retrieved from the stored grain array on a pixel-by-pixel basis.

14. The apparatus of claim 1, wherein the blended noise data is configured to be generated based on the noise pixel data on a pixel-by-pixel basis.

15. The apparatus of claim 1, wherein the blended noise data is configured to be applied to the at least one reconstructed video pixel on a pixel-by-pixel basis.

16. The apparatus of claim 1, wherein the stored grain array is a luminosity grain array, and wherein the noise pixel data includes luminosity noise pixel data.

17. The apparatus of claim 1, wherein the stored grain array is a chroma grain array, and wherein the noise pixel data includes chroma noise pixel data.

18. The apparatus of claim 1, wherein the at least one processor is configured to:
apply a scaling factor to the at least one output video pixel.

19. The apparatus of claim 1, wherein the at least one processor is configured to:
round a pixel value of the at least one output video pixel.

20. The apparatus of claim 1, wherein the at least one processor is configured to:
clip a pixel value of the at least one output video pixel.

21. The apparatus of claim 1, wherein the at least one memory is configured to store the at least one reconstructed video pixel.

22. The apparatus of claim 1, wherein the at least one processor is configured to:
output the at least one output video pixel for storage in the at least one memory.

23. The apparatus of claim 1, further comprising:
a display configured to display the at least one output video pixel.

24. The apparatus of claim 1, further comprising:
a communication interface configured to transmit the at least one output video pixel to a recipient device.

25. The apparatus of claim 1, wherein the at least one processor is configured to:
encode video data to generate encoded video data; and
decode at least the encoded video data to generate the at least one reconstructed video pixel.

26. The apparatus of claim 1, wherein the apparatus includes at least one of a head-mounted display (HMD), a mobile handset, or a wireless communication device.

27. A method for video decoding, the method comprising:
retrieving, from a stored grain array, noise pixel data associated with at least one reconstructed video pixel, wherein the noise pixel data includes at least a first block of noise pixel data and a second block of noise pixel data, wherein the first block of noise pixel data and the second block of noise pixel data both have a first size, and wherein the first size is based on a second size of a block of reconstructed video data that includes the at least one reconstructed video pixel;
blending a first line of noise pixels from the first block of noise pixel data and a second line of noise pixels from the second block of noise pixel data to generate blended noise data; and
applying the blended noise data to the at least one reconstructed video pixel to generate at least one output video pixel.

28. The method of claim 27, wherein the first block of noise pixel data and the second block of noise pixel data overlap at an overlap region, and wherein the overlap region includes a first line of noise pixels from the first block of noise pixel data and a second line of noise pixels from the second block of noise pixel data, wherein the first block of noise pixel data and the second block of noise pixel data are adjacent to one another in a first direction with the overlap region between the first block of noise pixel data and the second block of noise pixel data, wherein the first line of noise pixels from the first block of noise pixel data and the second line of noise pixels from the second block of noise pixel data are both arranged in a second direction that is perpendicular to the first direction.

29. The method of claim 28, wherein the noise pixel data includes a third block of noise pixel data and a fourth block of noise pixel data, wherein the third block of noise pixel data and the fourth block of noise pixel data are adjacent to one another in the first direction with a second overlap region between the third block of noise pixel data and the fourth block of noise pixel data, wherein the blended noise data includes a second blended line of noise pixels corresponding to the second overlap region that is arranged in the second direction, wherein; the first block of noise pixel data and the third block of noise pixel data are adjacent to one another in the second direction with a third overlap region between the first block of noise pixel data and the third block of noise pixel data, wherein the blended noise data includes a third blended line of noise pixels corresponding to the third overlap region that is arranged in the first direction, wherein the second block of noise pixel data and the fourth block of noise pixel data are adjacent to one another in the second direction with a fourth overlap region between the first block of noise pixel data and the third block of noise pixel data, and wherein the blended noise data includes a fourth blended line of noise pixels corresponding to the fourth overlap region that is arranged in the first direction.

30. The method of claim 27, further comprising:
identifying a position of the noise pixel data in the stored grain array based on an offset to retrieve the first block of noise pixel data, wherein the offset corresponds to a block that the at least one reconstructed video pixel is part of.

* * * * *